United States Patent
Saruwatari et al.

(10) Patent No.: US 8,415,053 B2
(45) Date of Patent: Apr. 9, 2013

(54) NONAQUEOUS ELECTROLYTE BATTERY, BATTERY PACK AND RECHARGEABLE VACUUM CLEANER

(75) Inventors: Hidesato Saruwatari, Saku (JP); Hiroki Inagaki, Kawasaki (JP); Hideaki Morishima, Ichikawa (JP); Shinsuke Matsuno, Kashiwa (JP); Yumi Fujita, Yokohama (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1459 days.

(21) Appl. No.: 11/756,259

(22) Filed: May 31, 2007

(65) Prior Publication Data

US 2007/0281214 A1    Dec. 6, 2007

(30) Foreign Application Priority Data

Jun. 2, 2006 (JP) .................. 2006-155088
Feb. 28, 2007 (JP) .................. 2007-050389

(51) Int. Cl.
*H01M 4/13* (2010.01)

(52) U.S. Cl.
USPC ................... 429/231.5; 429/231.95

(58) Field of Classification Search ............ 429/231.5, 429/231.95
See application file for complete search history.

(56) References Cited

U.S. PATENT DOCUMENTS

| | | | |
|---|---|---|---|
| 2005/0064282 A1 | 3/2005 | Inagaki et al. | |
| 2005/0069777 A1 | 3/2005 | Takami et al. | |
| 2005/0221173 A1 | 10/2005 | Tatebayashi et al. | |
| 2005/0221187 A1 | 10/2005 | Inagaki et al. | |
| 2005/0221188 A1 | 10/2005 | Takami et al. | |
| 2006/0046155 A1 | 3/2006 | Inagaki et al. | |
| 2006/0068272 A1 | 3/2006 | Takami et al. | |
| 2006/0134520 A1 | 6/2006 | Ishii et al. | |
| 2006/0216600 A1 | 9/2006 | Inagaki et al. | |
| 2006/0257746 A1 | 11/2006 | Inagaki et al. | |
| 2007/0009794 A1 | 1/2007 | Takami et al. | |
| 2007/0009797 A1 | 1/2007 | Takami et al. | |
| 2007/0009798 A1 | 1/2007 | Inagaki et al. | |

(Continued)

FOREIGN PATENT DOCUMENTS

| JP | 10-270019 | | 10/1998 |
|---|---|---|---|
| JP | 2001-143702 | * | 2/2001 |

(Continued)

OTHER PUBLICATIONS

U.S. Appl. No. 11/687,860, filed Mar. 19, 2007, Yumi Fujita, et al.

(Continued)

*Primary Examiner* — Helen O Conley
(74) *Attorney, Agent, or Firm* — Oblon, Spivak, McClelland, Maier & Neustadt, L.L.P.

(57) ABSTRACT

A nonaqueous electrolyte battery includes a positive electrode, a negative electrode and a nonaqueous electrolyte. At least one of the positive electrode and the negative electrode comprises a current collector made of aluminum or an aluminum alloy and an active material layer laminated on the current collector. The active material layer contains first active material particles having an average particle diameter of 1 μm or less and a lithium diffusion coefficient of $1 \times 10^{-9}$ $cm^2/sec$ or less at 20° C., and second active material particles having an average particle diameter of 2 to 50 μm. A true density of the second active material particles is larger by 0.01 to 2.5 $g/cm^3$ than a true density of the first active material particles.

5 Claims, 9 Drawing Sheets

U.S. PATENT DOCUMENTS

| | | |
|---|---|---|
| 2007/0009801 A1 | 1/2007 | Inagaki et al. |
| 2007/0059592 A1 | 3/2007 | Takami et al. |
| 2007/0059602 A1 | 3/2007 | Morishima et al. |
| 2007/0072080 A1 | 3/2007 | Inagaki et al. |
| 2008/0070115 A1 | 3/2008 | Saruwatari et al. |

FOREIGN PATENT DOCUMENTS

| | | |
|---|---|---|
| JP | 2002-100354 | 4/2002 |
| JP | 2002-158139 | 5/2002 |
| JP | 2004-119218 | 4/2004 |

OTHER PUBLICATIONS

U.S. Appl. No. 11/694,454, filed Mar. 30, 2007, Hiroki Inagaki, et al.
U.S. Appl. No. 11/687,844, filed Mar. 19, 2007, Yumi Fujita, et al.
U.S. Appl. No. 12/687,860, filed Jul. 30, 2009, Inagaki, et al.
U.S. Appl. No. 11/853,546, filed Sep. 11, 2007, Harada, et al.
U.S. Appl. No. 11/940,688, filed Nov. 15, 2007, Inagaki, et al.
U.S. Appl. No. 13/181,211, filed Jul. 12, 2011, Inagaki, et al.

\* cited by examiner

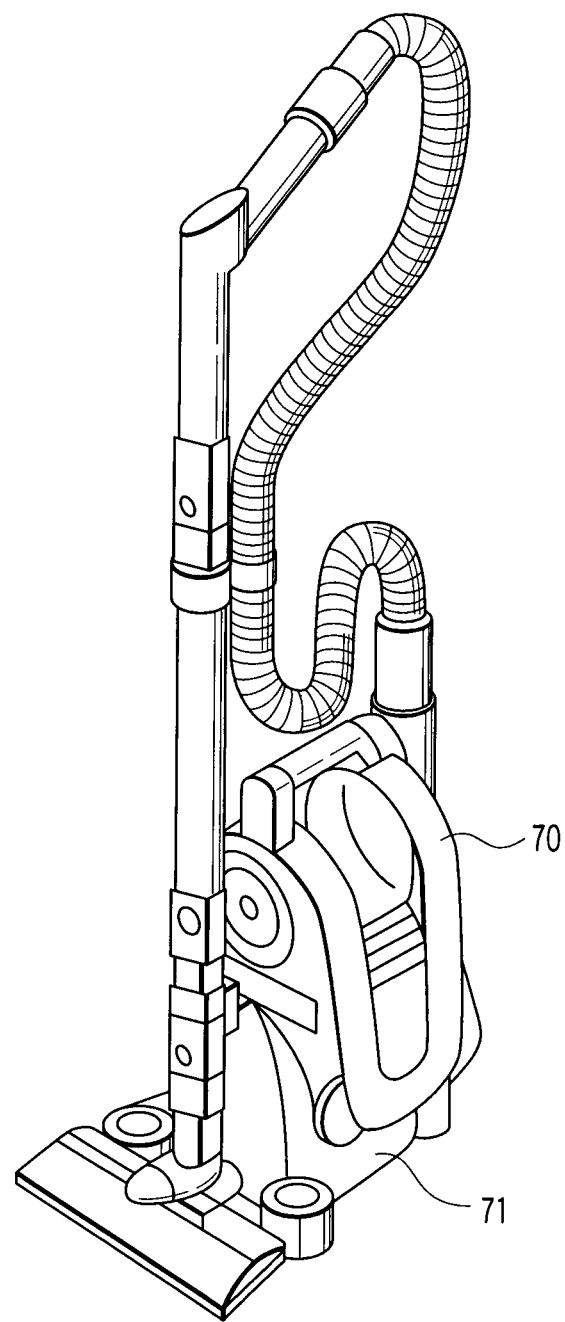
F I G. 13

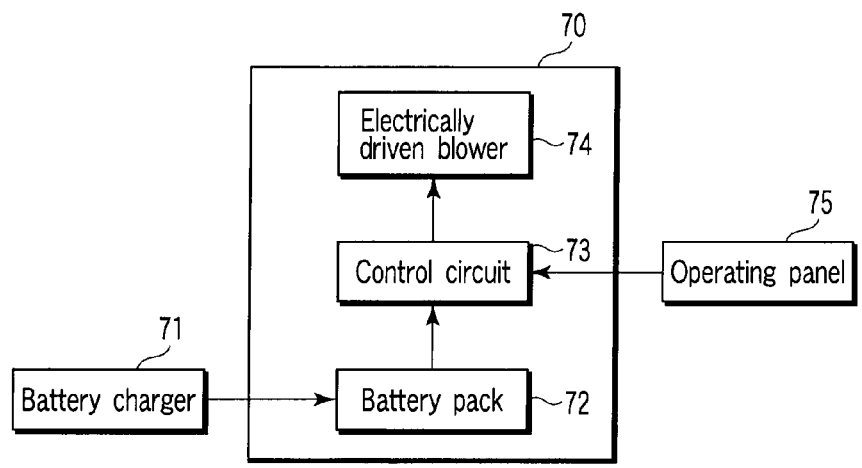
F I G. 14
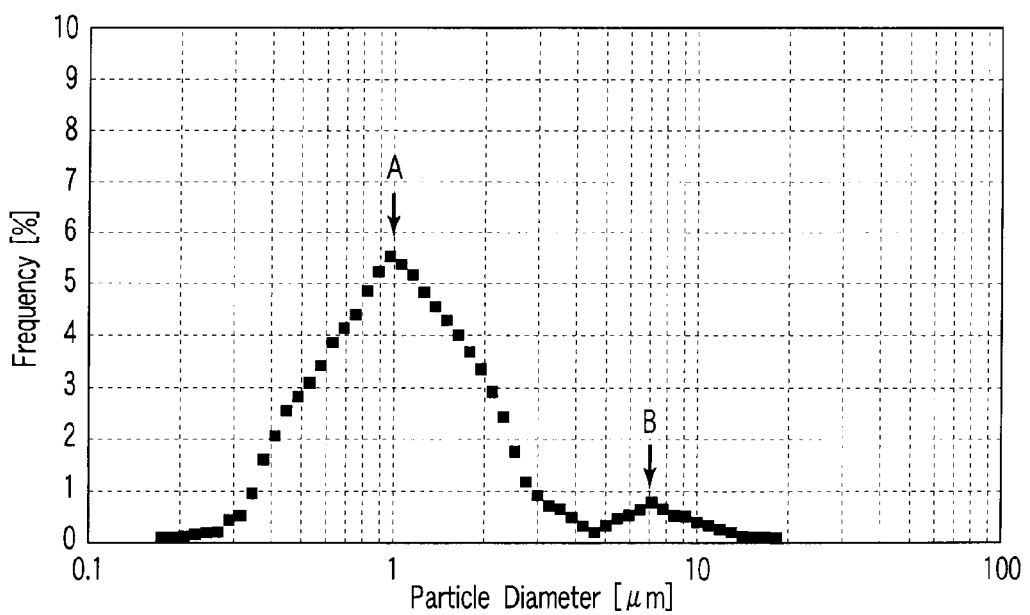
F I G. 15

NONAQUEOUS ELECTROLYTE BATTERY, BATTERY PACK AND RECHARGEABLE VACUUM CLEANER

CROSS-REFERENCE TO RELATED APPLICATIONS

This application is based upon and claims the benefit of priority from prior Japanese Patent Applications No. 2006-155088, filed Jun. 2, 2006; and No. 2007-050389, filed Feb. 28, 2007, the entire contents of both of which are incorporated herein by reference.

BACKGROUND OF THE INVENTION

1. Field of the Invention

The invention relates to a nonaqueous electrolyte battery, a battery pack using the nonaqueous electrolyte battery and a rechargeable vacuum cleaner.

2. Description of the Related Art

Use of a negative electrode active material with an average particle diameter of 1 μm or less for a nonaqueous electrolyte battery has been investigated. However, a negative electrode using the negative electrode active material is deficient in impregnating ability of the nonaqueous electrolyte since the negative electrode active material is compactly packed in the negative electrode, and may bring up a problem of deterioration of cycle performance.

JP-A 2004-119218 (KOKAI) and JP-A 2002-100354 (KOKAI) have reported that characteristics of respective active materials can be maximally exerted by using a mixture of a plurality of active materials having different average particle diameters from one another.

JP-A 2004-119218 (KOKAI) describes that discharge performance at a large load current can be improved by controlling the press density of large diameter particles and small diameter particles of lithium-cobalt composite oxide in the range of 2.8 to 3.2 $g/cm^3$ and 2.7 to 3.2 $g/cm^3$, respectively. The press density described in JP-A 2004-119218 (KOKAI) refers to an apparent press density obtained when a powder of the particles is compressed at a pressure of 0.3 $t/cm^2$, and differs from a true density.

On the other hand, JP-A 2002-100354 (KOKAI) discloses controlling the proportion of the number of fine particles with a particle diameter of less than 1 μm in the range of 7 to 85% by pulverizing agglomerate lithium titanate obtained by a solid-solid reaction in order to improve discharge capacity and heavy drain discharge performance of the nonaqueous electrolyte secondary battery. In JP-A 2002-100354 (KOKAI), the true densities of the particles constituting the mixture are the same since the mixture of the particles with a particle diameter of less than 1 μm and the particles with a particle diameter of 1 μm or more is obtained by pulverization.

BRIEF SUMMARY OF THE INVENTION

According to a first aspect of the present invention, there is provided a nonaqueous electrolyte battery comprising:
a positive electrode;
a negative electrode; and
a nonaqueous electrolyte,
wherein at least one of the positive electrode and the negative electrode comprises:
a current collector made of aluminum or an aluminum alloy; and
an active material layer which is laminated on the current collector, the active material layer containing
first active material particles having an average particle diameter of 1 μm or less and a lithium diffusion coefficient of $1 \times 10^{-9}$ $cm^2/sec$ or less at 20° C. and
second active material particles having an average particle diameter of 2 to 50 μm,
a true density of the second active material particles is larger by 0.01 to 2.5 $g/cm^3$ than a true density of the first active material particles.

According to a second aspect of the present invention, there is provided a nonaqueous electrolyte battery comprising:
a positive electrode;
a negative electrode comprising a current collector made of aluminum or an aluminum alloy and an active material layer laminated on the current collector, the active material layer containing
first active material particles that have an average particle diameter of 1 μm or less and are represented by $Li_{4+x}Ti_5O_{12}$ ($0 \leq x \leq 3$) and
second active material particles having an average particle diameter of 2 to 50 μm, and a true density of the second active material particles being larger by 0.01 to 2.5 $g/cm^3$ than a true density of the first active material particles; and
a nonaqueous electrolyte.

According to a third aspect of the present invention, there is provided a nonaqueous electrolyte battery comprising:
a positive electrode comprising a current collector made of aluminum or an aluminum alloy and an active material layer laminated on the current collector, the active material layer containing
first active material particles that have an average particle diameter of 1 μm or less and are represented by $Li_yMn_2O_4$ ($0 \leq y \leq 1$) and
second active material particles having an average particle diameter of 2 to 50 μm, and a true density of the second active material particles being larger by 0.01 to 2.5 $g/cm^3$ than a true density of the first active material particles;
a negative electrode; and
a nonaqueous electrolyte.

According to a fourth aspect of the present invention, there is provided a battery pack comprising a nonaqueous electrolyte battery comprising a positive electrode, a negative electrode and a nonaqueous electrolyte,
wherein at least one of the positive electrode and the negative electrode comprises:
a current collector made of aluminum or an aluminum alloy; and
an active material layer which is laminated on the current collector, the active material layer containing
first active material particles having an average particle diameter of 1 μm or less and a lithium diffusion coefficient of $1 \times 10^{-9}$ $cm^2/sec$ or less at 20° C., and
second active material particles having an average particle diameter of 2 to 50 μm,
a true density of the second active material particles is larger by 0.01 to 2.5 $g/cm^3$ than a true density of the first active material particles.

According to a fifth aspect of the present invention, there is provided a battery pack comprising a nonaqueous electrolyte battery comprising a positive electrode, a negative electrode and a nonaqueous electrolyte,
wherein the negative electrode comprises a current collector made of aluminum or an aluminum alloy and an active material layer laminated on the current collector, the active material layer containing first active material particles that have an average particle diameter of 1 µm or less and are represented by $Li_{4+x}Ti_5O_{12}$ ($0 \leq x \leq 3$) and second active material particles having an average particle diameter of 2 to 50 µm, and a true density of the second active material particles is larger by 0.01 to 2.5 g/cm³ than a true density of the first active material particles.

According to a sixth aspect of the present invention, there is provided a battery pack comprising a nonaqueous electrolyte battery comprising a positive electrode, a negative electrode and a nonaqueous electrolyte, wherein the positive electrode comprises a current collector made of aluminum or an aluminum alloy and an active material layer laminated on the current collector, the active material layer containing first active material particles that have an average particle diameter of 1 µm or less and are represented by $Li_yMn_2O_4$ ($0 \leq y \leq 1$) and second active material particles having an average particle diameter of 2 to 50 µm, and a true density of the second active material particles is larger by 0.01 to 2.5 g/cm³ than a true density of the first active material particles.

BRIEF DESCRIPTION OF THE SEVERAL VIEWS OF THE DRAWING

FIG. 13 is a schematic illustration of a rechargeable vacuum cleaner according to a fourth embodiment;

FIG. 14 is a constitution diagram of the rechargeable vacuum cleaner shown in FIG. 13; and FIG. 15 is a characteristic graph showing an example of a particle diameter distribution measured by laser diffraction in respect of a mixture containing the first active material particles and second active material particles.

DETAILED DESCRIPTION OF THE INVENTION

First Embodiment

Figure 1:
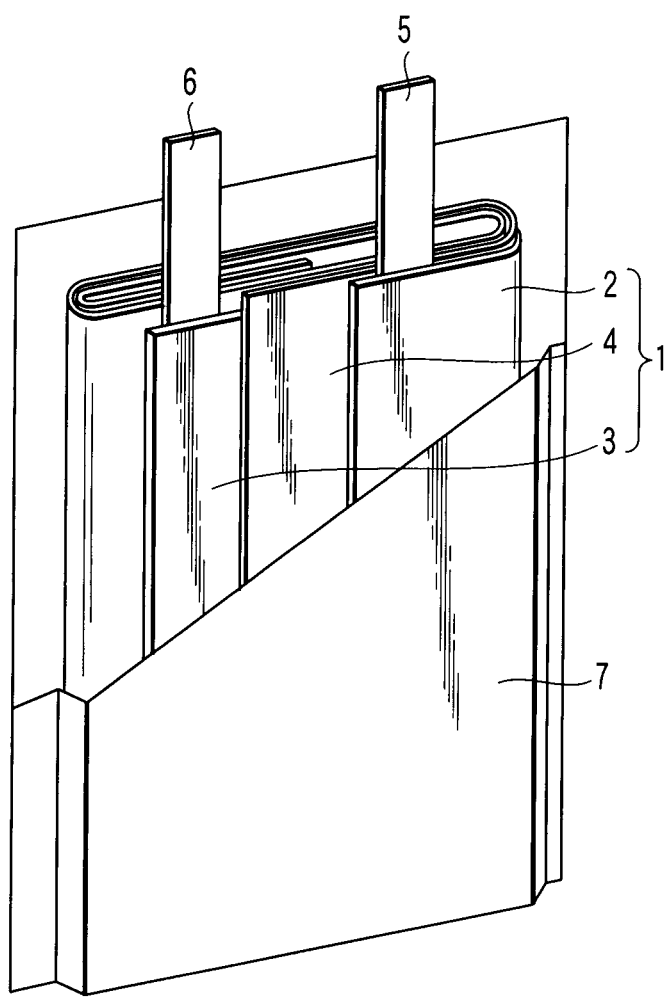
FIG. 1 is a partially cut perspective view showing a nonaqueous electrolyte battery according to a first embodiment.

The diffusion length of ions in the active material is shortened when the average particle diameter of the active material, which inserts and releases lithium ions and in which the lithium diffusion coefficient is $1 \times 10^{-9}$ cm²/sec or less at 20° C., is 1 µm or less. As a result, output performance under a large load current is improved. However, the electrode is heterogeneously impregnated with the nonaqueous electrolyte since the active material is too densely packed in the electrode. Also, contact between the active material and a current collector is impaired when an aluminum foil or aluminum alloy foil is used as a current collector of the active material particles. Consequently, the active material is peeled from the current collector by repeating charge-discharge cycle. For these reasons, high cycle performance could not be attained in the nonaqueous electrolyte battery that employs active material particles having a lithium diffusion coefficient of $1 \times 10^{-9}$ cm²/sec or less at 20° C. and an average particle diameter of 1 µm or less, and uses an aluminum foil or aluminum alloy foil as a current collector. The cycle performance was further decreased when the nonaqueous electrolyte battery was used in rechargeable vacuum cleaners and vehicles, since expansion and contraction of the active material were enhanced by subjecting the nonaqueous electrolyte battery to a deep charge step and a deep discharge step repeatedly.

The inventors of the invention have found that the cycle performance of the nonaqueous electrolyte battery is improved when the nonaqueous electrolyte battery satisfies the following conditions (a) and (b).

(a) The battery employs first active material particles that have an average particle diameter of 1 µm or less and in which the lithium diffusion coefficient is $1 \times 10^{-9}$ cm²/sec or less at 20° C., and second active material particles having an average particle diameter in the range of 2 to 50 µm.

(b) The true density of the second active material particles is larger than the true density of the first active material particles, and the difference in the true densities between them is adjusted in the range of 0.01 to 2.5 g/cm³.

While the mechanism of the above-mentioned constitution for improving the cycle performance has not been elucidated yet, it may be conjectured as follows. Since the second active material particles have a large average particle diameter of 2 to 50 µm, spaces are formed in the electrode and impregnating ability of the nonaqueous electrolyte is improved. As a result, the contact area between the active material and nonaqueous electrolyte increases in the electrode, and thus diffusion of lithium ions in the electrode is improved due to increased an ion conductivity between the active material and nonaqueous electrolyte. In addition, the second active material particles readily sediment on the current collector after coating the current collector with a slurry containing the first active material particles and second active material particles, when the true density of the first active material particles and second active material particles satisfies the condition (b). Consequently, the current collector is able to tightly adhere to the active material layer and electronic conductivity of the electrode is improved. Meanwhile, diffusion ability of lithium ions in the electrode largely fluctuates by changing the average particle diameter for the first active material particles having a lithium diffusion coefficient of $1 \times 10^{-9}$ cm²/sec or less at 20° C. The diffusion reaction of lithium ions has two stages of a solid state diffusion stage in the active material particles and a liquid state diffusion stage in the nonaqueous electrolyte. The former is a rate-determining step in the first active material particles. Accordingly, diffusion ability of lithium ions in the electrode can be effectively improved by reducing the average particle diameter of the active material particles, since the diffusion length of the lithium ion in the active material particles is decreased by reducing the average particle diameter of the active material particles. On the other hand, fluctuation of diffusion ability of lithium ions in the electrode is small in the lithium-cobalt composite oxide such as $LiCoO_2$ according to JP-A 2004-119218 even by changing the average particle diameter, since the lithium diffusion coefficient at 20° C. is larger than $1\times10^{-9}$ $cm^2$/sec.

The inventors of the invention have found that the active material layer is suppressed from being peeled from the current collector while a large load current performance is improved, by improving adhesiveness between the active material layer and the current collector, when the diffusion ability of the lithium ion is largely dependent on the average particle diameter of the active material particles. Consequently, the battery is suppressed from being deteriorated by the charge-discharge cycle to enable the cycle performance to be improved. Improvement of the cycle performance may be considered to be a result of a synergic effect brought about by the improvements of electronic conductivity and diffusion ability of the lithium ion in a good balance.

While cycle performance of the nonaqueous electrolyte battery can be improved by using an electrode that satisfies the conditions (a) and (b) for at least one of a positive electrode and a negative electrode, the electrode is desirably used at least for the negative electrode in order to obtain a sufficient effect.

The composition of the first active material particles is desirably represented by $Li_{4+x}Ti_5O_{12}$ (x changes in the range of $0\leq x\leq 3$ by the charge-discharge reaction) when the electrode is used for the negative electrode. Since $Li_{4+x}Ti_5O_{12}$ has low electric conductivity by itself, improvement of the battery performance becomes particularly evident when the average particle diameter is small. The lithium diffusion coefficient at 20° C. in $Li_{4+x}Ti_5O_{12}$ is approximately in the order of $1\times10^{-12}$ $cm^2$/sec. The lower limit of the lithium diffusion coefficient in the first active material particles can be adjusted to $1\times10_{-15}$ $cm^2$/sec.

While the second active material particles may be particles capable of inserting and releasing lithium ions, the composition may be selected from $Li_{4+x}Ti_5O_{12}$ (x changes in the range of $0\leq x\leq 3$ by the charge-discharge reaction), $MnO_2$, FeS, $FeS_2$, CuO, $Cu_4O(PO_4)_2$, $MoO_3$ and $TiO_2$. The composition of the second active material particles is not restricted to one kind, and plural kinds of the compositions may be used.

In the case where the electrode is used for the positive electrode, examples of the first active material particles and second active material particles include $Li_yMn_2O_4$ (y changes in the range of $0\leq y\leq 1$ by the charge-discharge reaction). The lithium diffusion coefficient in $Li_yMn_2O_4$ at 20° C. is approximately in the order of $10^{-9}$ $cm^2$/sec.

The method for measuring the lithium diffusion coefficient will be described below. The lithium diffusion coefficient is estimated by cyclic voltammetry in this embodiment. The nonaqueous electrolyte battery is disassembled in a glove box in an argon atmosphere, and the positive electrode and negative electrode are taken out of the battery. The exposed positive and negative electrodes are washed with methylethyl carbonate to extract the nonaqueous electrolyte impregnated in the positive and negative electrodes. After drying the positive and negative electrodes in vacuum, each electrode is cut into pieces with a size of 2×2 cm. One piece of the electrode cut from the positive electrode is used as a working electrode while one piece of the electrode cut from the negative electrode is used as a working electrode when the positive electrode or negative electrode is used for the measurement, respectively. When either the positive electrode or negative electrode is used for the working electrode, lithium metal is used for a counter electrode and a reference electrode to manufacture a cell of a three pole type. The electrolytic solution used is prepared by dissolving $LiClO_4$ at 1 M concentration in a mixed solvent of ethylene carbonate (EC) and diethyl carbonate (DEC) in 1:1 volume ratio. Voltamogram is measured in a scanning range from 0.5 to 4.4 V vs. Li/Li+ at 20° C. using the cell of the three pole type obtained. Voltamogram is measured at each scanning rate of 1, 3, 5, 10, 20, 30, 40 or 50 mV/sec. A reduction peak current at each scanning rate is read from the voltamogram obtained, the current intensity is plotted against the root square of the scanning rate, and a gradient of the line obtained is calculated. Since the gradient of the line corresponds to $2.71\times10^5 n^{3/2}AD^{1/2}c$ in equation (2) below, the diffusion coefficient D is calculated from the relation of this value and the gradient of the line:

$$Ip=2.71\times10^5 n^{3/2}AD^{1/2}v^{1/2}c \quad (2)$$

where Ip is a reduction peak current [A], n is the number of reaction electrons, A is the area ($cm^2$) of the working electrode, D is the diffusion coefficient ($cm^2$/sec) at 20° C., v is the scanning rate [mV/sec] and c is the concentration of the electrolytic solution (1 M in this example).

The first active material particles and second active material particles will be described in more detail below.

The average particle diameter of the first active material particles is adjusted to 1 μm or less for improving the output performance under a large load current of the nonaqueous electrolyte battery. However, nonconformity tends to occur in the electrode manufactured using the first active material particles having the average particle diameter of less than 0.5 μm, and mass-productivity may be adversely affected. Accordingly, the lower limit of the average particle diameter is desirably 0.5 μm. A more preferable range of the average particle diameter of the first active material particles is 0.55 to 0.95 μm.

The effect for improving impregnating ability of the nonaqueous electrolyte cannot be obtained when the average particle diameter of the second active material particles is less than 2 μm. On the other hand, output performance under a large load current may be adversely affected when the average particle diameter is larger than 50 μm since the ion diffusion length in the active material particles becomes too long. Accordingly, the average particle diameter of the active material particles is more preferably in the range of 3 to 40 μm.

The method for measuring the average particle diameter of the first active material particles and second active material particles will be described below. The nonaqueous electrolyte battery is disassembled in a glove box in an argon atmosphere, and the positive electrode and negative electrode are taken out of the battery. The exposed positive electrode and negative electrode are washed with methylethyl carbonate to extract the nonaqueous electrolyte impregnated in the positive electrode and negative electrode. After drying these electrodes in vacuum, the positive electrode and negative electrode are independently immersed in an N-methyl-2-pyrrolidone solution to extract a binder in the positive electrode and negative electrode with the N-methyl-2-pyrrolidone solution. As a result, the active material layer is peeled from the current collector in the N-methyl-2-pyrrolidone solution, and a powder mainly consisting of the first active material particles and second active material particles are dispersed in the solution. The average particle diameter is measured by analyzing the suspension with a laser diffraction particle size analyzer (for example, trade name: Micro Track MT 3200, manufactured by Nikkiso Co., Ltd.). An example of the particle diameter distribution measured by the laser diffraction is shown in FIG. 15. The average particle diameter defined in the specification denotes a d50% value in the particle diameter distribution.

An effect for improving the cycle performance cannot be obtained when the difference between the true density of the first active material particles and that of the second active material particles is smaller than 0.01 g/cm$^3$. On the other hand, an effect for improving impregnating ability of the liquid nonaqueous electrolyte by forming pores in the electrode can be hardly obtained when the difference in the true density is larger than 2.5 g/cm$^3$ since the second active material particles are too concentrated on the current collector. Accordingly, the difference in the true density is more preferably in the range of 0.02 to 2 g/cm$^3$.

The true density is a theoretical density for a solid material defined by taking atom deficiency, dislocations and trace impurities into consideration without taking pores in the solid material into consideration. Accordingly, means for adjusting the true density of the active material particles include addition of trace impurities, adjustment of the oxygen content by controlling the atmosphere during baking, and setting of the baking condition (temperature or time).

The method for measuring the true density of the active material particles will be described below. A pycnometer method is used for the measurement, while methanol is used for immersion liquid at room temperature (25° C.). About 10 to 15 g of the active material particles are sampled in a pycnometer of 50 cc, the immersion liquid is filled therein so that the active material particles are soaked with the immersion liquid, and the immersion liquid is degassed in vacuum for about 10 minutes. After degassing, the pycnometer is allowed to stand for 15 hours in a shaker equipped with a temperature controller set at room temperature, and the density is determined by filling the pycnometer with the immersion liquid and measuring the weight.

While two peaks are observed in the particle size distribution measured by the laser diffraction in respect of the mixture containing the first active material particles and the second active material particles, the first peak and second peak desirably satisfy equation (1) below provided that the peak at a smaller particle diameter corresponds to the first peak and the peak at the larger particle diameter corresponds to the second peak:

$$2 \leq (F_1/F_2) \leq 20 \quad (1)$$

where $F_1$ is the frequency of the first peak and $F_2$ is the frequency of the second peak.

The first peak may be considered as a mode diameter in the particle diameter distribution measured by the laser diffraction in respect of the first active material particles, while the second peak may be considered as a mode diameter in the particle diameter distribution of the second active material particles. The mode diameter as used herein denotes a peak top of the particle diameter distribution by providing a horizontal axis for the particle diameter and a vertical axis for the frequency, which distribution is measured by the laser diffraction. Accordingly, the ratio of $F_1/F_2$ may be used as an index of the proportion of the first active material particles to the second active material particles. A $F_1/F_2$ ratio of 2 or more permits the output performance under a large load current to be improved since the specific surface area of the electrode can be sufficiently increased. The cycle performance may be further improved by adjusting the $F_1/F_2$ ratio to 20 or less. The $F_1/F_2$ ratio is more preferably in the range of 5 to 15.

The frequencies of the first and second peaks are calculated using the particle diameter distribution measured by the laser diffraction as shown in FIG. 15. There are two peaks in the particle diameter distribution in FIG. 15. A first peak A at the smaller particle diameter can be considered as the mode diameter of the first active material particles. The frequency $F_1$ of the first peak A is 5.53% in FIG. 15. A second peak B at the larger particle diameter can be considered as the mode diameter of the second active material particles. The frequency $F_2$ of the second peak B is 0.80% in FIG. 15. Accordingly, the $F_1/F_2$ ratio is 6.91 in FIG. 15.

The specific surface area of the first active material particles is desirably in the range of 7 to 100 m$^2$/g. Impregnating ability of the nonaqueous electrolyte may be further improved when the specific surface area is 7 m$^2$/g or more. In addition, side reactions due to an increase of reaction fields may be suppressed when the specific surface area is 100 m$^2$/g or less. The specific surface area of the first active material particles is more preferably in the range of 8 to 40 m$^2$/g.

The nonaqueous electrolyte battery according to the invention will be described below for respective parts.

(1) Positive Electrode

The positive electrode comprises a positive electrode current collector and a positive electrode active material layer that is laminated on one surface or both surfaces of the current collector and contains an active material, a conductive agent and a binder. The positive electrode is manufactured, for example, by adding the conductive agent and binder to the positive electrode active material, suspending them in an appropriate solvent, and applying the slurry on the current collector followed by drying and pressing to form a strip-shaped electrode.

While the above-mentioned first active material particles and second active material particles can be used for the positive electrode active material, a positive electrode active material other than the active material comprising the first active material particles and second active material particles may be used when the above-mentioned first active material particles and second active material particles are used for the negative electrode active material.

Examples of the positive electrode active material other than the active material comprising the first active material particles and second active material particles include manganese dioxide (MnO$_2$), iron oxide, copper oxide, nickel oxide, Li$_a$MnO$_2$, lithium-nickel composite oxide (for example Li$_a$NiO$_2$), lithium-cobalt composite oxide (for example Li$_a$CoO$_2$), lithium-nickel-cobalt composite oxide {for example LiNi$_{1-e-f}$Co$_e$M$_f$O$_2$ (M is at least one element selected from the group consisting of Al, Cr and Fe), $0 \leq e \leq 0.5$, $0 \leq f \leq 0.1$}, lithium-manganese-cobalt composite oxide {for example LiMn$_{1-g-h}$Co$_g$M$_h$O$_2$ (M is at least one element selected from the group consisting of Al, Cr and Fe), $0 \leq g \leq 0.5$, $0 \leq h \leq 0.1$}, lithium-manganese-nickel composite oxide {for example LiMn$_j$Ni$_j$M$_{1-2j}$O$_2$ (M is at least one element selected from the group consisting of Co, Cr, Al and Fe), $\frac{1}{3} \leq j \leq \frac{1}{2}$, for example LiMn$_{1/3}$Ni$_{1/3}$Co$_{1/3}$O$_2$, LiMn$_{1/2}$Ni$_{1/2}$O$_2$}, spinel type lithium-manganese-nickel composite oxide (Li$_a$Mn$_{2-b}$Ni$_b$O$_4$), lithium iron phosphates having an olivine structure (such as Li$_a$FePO$_4$, Li$_a$Fe$_{1-b}$Mn$_b$PO$_4$ and Li$_a$CoPO$_4$), iron sulfate (Fe$_2$(SO$_4$)$_3$), and vanadium oxide (for example V$_2$O$_5$). A preferable range of a, b and c is 0 to 1. Examples of other materials include organic and inorganic materials. Examples of the organic and inorganic materials include conductive polymer materials such as polyaniline and polypyrrole, disulfide polymer materials, sulfur (S) and fluorinated carbon.

Examples of more preferable positive electrode active materials include lithium-nickel composite oxide, lithium-cobalt composite oxide, lithium-nickel-cobalt composite oxide, lithium-manganese-nickel composite oxide, spinel type lithium-manganese-nickel composite oxide, lithium-manganese-cobalt composite oxide and lithium iron phosphates. These positive electrode active materials afford a high battery voltage.

Examples of the conductive agent include acetylene black, KETJEN BLACK, graphite and coke.

Examples of the binder include polytetrafluoroethylene (PTFE), polyvinylidene fluoride (PVdF) and fluorinated rubber.

Preferably, the blending ratio of the positive electrode active material is in the range of 80 to 95% by weight, the blending ratio of the conductive agent is in the range of 3 to 20% by weight, and the blending ratio of the binder is in the range of 2 to 7% by weight.

It is desirable for the positive electrode current collector to be formed of an aluminum foil or an aluminum alloy foil. It is desirable for the aluminum foil or the aluminum alloy foil forming the positive electrode current collector to have an average crystal grain size not larger than 50 µm. It is more desirable for the average crystal grain size noted above to be not larger than 30 µm, and furthermore desirably not larger than 5 µm. Where the average crystal grain size of the aluminum foil or the aluminum alloy foil forming the positive electrode current collector is not larger than 50 µm, the mechanical strength of the aluminum foil or the aluminum alloy foil can be drastically increased to make it possible to press the positive electrode with a high pressure. It follows that the density of the positive electrode can be increased to increase the battery capacity.

The average crystal grain size can be obtained as follows. Specifically, the texture of the current collector surface is observed with an electron microscope so as to obtain the number n of crystal grains present within an area of 1 mm×1 mm. Then, the average crystal grain area S is obtained from the formula "$S=1\times10^6/n$ (µm$^2$)", where n is the number of crystal grains noted above. Further, the average crystal grain size d (µm) is calculated from the area S by formula (A) given below:

$$d=2(S/\pi)^{1/2} \quad (A)$$

The average crystal grain size of the aluminum foil or the aluminum alloy foil can be complicatedly affected by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 µm, preferably not larger than 15 µm. Also, it is desirable for the aluminum foil to have a purity not lower than 99%. Further, it is desirable for the aluminum alloy to contain, for example, magnesium, zinc and silicon. On the other hand, it is desirable for the content of the transition metals such as iron, copper, nickel and chromium in the aluminum alloy to be not higher than 1%.

(2) Negative Electrode

The negative electrode comprises a negative electrode current collector and a negative electrode active material layer that is laminated on one surface or both surfaces of the current collector and contains an active material, a binder and optionally a conductive agent. The negative electrode is manufactured, for example, by adding the binder to a powder of the negative electrode active material, suspending them in an appropriate solvent, and applying the slurry on the current collector followed by drying and pressing to form a strip-shaped electrode.

While the above-mentioned first active material particles and second active material particles may be used for the negative electrode active material, a negative electrode active material other than the active material comprising the first active material particles and second active material particles may be used when the above-mentioned first active material particles and second active material particles are used for the positive electrode active material.

Examples of the negative electrode active material other than the active material comprising the first active material particles and second active material particles include lithium metal, lithium alloy, carbonaceous material and metal compounds.

Examples of the lithium alloy include lithium-aluminum alloy, lithium-zinc alloy, lithium-magnesium alloy, lithium-silicon alloy and lithium-lead alloy. A lithium alloy foil may be directly used as a strip-shaped electrode.

Examples of the carbonaceous material include natural graphite, synthetic graphite, coke, vapor-grown carbon fiber, mesophase pitch based carbon fiber, spherical carbon and resin-baked carbon. Preferable examples of the carbonaceous material include vapor-grown carbon fiber, mesophase pitch based carbon fiber and spherical carbon. The carbonaceous material preferably has a layer spacing $d_{002}$ of 0.340 nm or less derived from (002) reflection of X-ray diffraction.

Examples of the metal compound include metal oxide, metal sulfide and metal nitride.

Examples of the above-mentioned metal oxide include titanium-containing metal composite oxide, amorphous tin oxide such as $SnB_{0.4}P_{0.6}O_{3.1}$, tin silicates such as $SnSiO_3$, silicon oxide such as SiO and tungsten oxide such as $WO_3$. The titanium-containing metal composite oxide is preferable among them.

Examples of the titanium-containing metal composite oxide include $Li_{2+f}Ti_3O_7$ ($-1 \leq f \leq 3$) having a ramsdelite structure, and metal composite oxide containing Ti and at least one element selected from the group consisting of P, V, Sn, Cu, Ni and Fe. Examples of the metal composite oxide, containing Ti and at least one element selected from the group consisting of P, V, Sn, Cu, Ni and Fe, include $TiO_2$—$P_2O_5$, $TiO_2$—$V_2O_5$, $TiO_2$—$P_2O_5$—$SnO_2$ and $TiO_2$—$P_2O_5$—MeO (Me is at least one element selected from the group consisting of Cu, Ni and Fe). The metal composite oxide preferably has low crystallinity and a micro-structure comprising a crystalline phase and an amorphous phase together or the amorphous phase alone. Such micro-structure permits the cycle performance to be largely improved. The lithium-titanium oxide and metal composite oxide containing Ti and at least one element selected from the group consisting of P, V, Sn, Cu, Ni and Fe are preferable among them.

Examples of the metal sulfide include titanium sulfide such as $TiS_2$, molybdenum sulfide such as $MoS_2$ and iron sulfide such as FeS, $FeS_2$ and $Li_xFeS_2$.

Examples of the metal nitride include lithium-cobalt nitride (for example $Li_sCo_tN$, $0<s<4$, $0<t<0.5$).

Examples of the conductive agent include acetylene black, KETJEN BLACK, graphite and metal powder.

Examples of the binder include polytetrafluoroethylene (PTFE), polyvinylidene fluoride (PVdF), fluorinated rubber and styrene-butadiene rubber.

Preferably, the blending ratio of the negative electrode active material is in the range of 80 to 98% by weight, the blending ratio of the conductive agent is in the range of 0 to 20% by weight, and the blending ratio of the binder is in the range of 2 to 7% by weight.

It is desirable for the current collector of the negative electrode to be formed of aluminum foil or aluminum alloy foil. It is also desirable for the negative electrode current collector to have an average crystal grain size not larger than 50 μm. In this case, the mechanical strength of the current collector can be drastically increased so as to make it possible to increase the density of the negative electrode by applying the pressing under a high pressure to the negative electrode. As a result, the battery capacity can be increased. Also, since it is possible to prevent the dissolution, corrosion and deterioration of the negative electrode current collector in an over-discharge cycle under an environment of a high temperature not lower than, for example, 40° C., it is possible to suppress the elevation in the impedance of the negative electrode. Further, it is possible to improve the output performance, the rapid charging performance, and the charge-discharge cycle performance of the battery. It is more desirable for the average crystal grain size of the negative electrode current collector to be not larger than 30 μm, furthermore desirably, not larger than 5 μm.

It is desirable for the aluminum foil or the aluminum alloy foil to have a thickness not larger than 20 μm, more desirably not larger than 15 μm. Also, it is desirable for the aluminum foil to have a purity not lower than 99%. It is desirable for the aluminum alloy to contain another element such as magnesium, zinc or silicon. On the other hand, it is desirable for the amount of the transition metal such as iron, copper, nickel and chromium contained in the aluminum alloy to be not larger than 1%.

(3) Nonaqueous Electrolyte

The nonaqueous electrolyte contains a nonaqueous solvent and an electrolyte dissolved in the nonaqueous solvent. The nonaqueous solvent can contain a polymer.

Examples of the electrolyte include lithium salts such as $LiPF_6$, $LiBF_4$, $Li(CF_3SO_2)_2N$ (bis-trifluoromethane-sulfonylamide lithium; common name LiTFSI), $LiCF_3SO_3$ (common name LiTFS), $Li(C_2F_5SO_2)_2N$ (bis-pentafluoroethanesulfonyl-amide lithium; common name LiBETI), $LiClO_4$, $LiAsF_6$, $LiSbF_6$, lithium bis-oxalatoborate ($LiB(C_2O_4)_2$, common name LiBOB), and difluoro(trifluoro-2-oxide-2-trifluoromethylpropionate(2-)-0,0) lithium borate ($LiBF_2(OCOOC(CF_3)_2)$, (common name $LiBF_2(HHIB)$))). One of these electrolyte may be used alone, or by mixing a plurality of them. $LiPF_6$ and $LiBF_4$ are particularly preferable.

The concentration of the electrolyte is preferably in the range of 1.5 to 3 M. In this manner, the performance under a large load current is further improved while the nonaqueous electrolyte is suppressed from being affected by the increase of the viscosity due to the increase of the electrolyte concentration.

While the nonaqueous solvent is not particularly restricted, examples of the solvent include propylene carbonate (PC), ethylene carbonate (EC), 1,2-dimethoxyethane (DME), γ-butyrolactone (GBL), tetrahydrofuran (THF), 2-methyl tetrahydrofuran (2-MeHF), 1,3-dioxolane, sulfolane, acetonitrile (AN), diethyl carbonate (DEC), dimethyl carbonate (DMC), methylethyl carbonate (MEC) and dipropyl carbonate (DPC). One of these solvents may be used alone, or a plurality of them may be used by mixing. γ-butyrolactone is preferable among them when thermal stability is emphasized. The solvent preferably contains EC, PC and GBL when thermal stability as well as low temperature performance is necessary. The thermal stability and the low temperature performance considered as the result of increase of entropy may be expected to increase by allowing the solvent to contain EC, PC and GBL as the cyclic carbonates. Since the cyclic carbonate has a larger viscosity than a linear carbonate, the cycle performance may be largely improved by using a nonaqueous solvent consisting essentially of the cyclic carbonates according to this embodiment.

Additives may be added to the nonaqueous electrolyte. While the additive is not particularly restricted, examples of the additive include vinylene carbonate (VC), vinylene acetate (VA), vinylene butyrate, vinylene hexanate, vinylene crotonate, and catechol carbonate. The concentration of the additive is preferably in the range of 0.1 to 3 wt %, more preferably 0.5 to 1 wt %, relative to 100 wt % of the nonaqueous electrolyte.

The structure of the nonaqueous electrolyte battery according to the first embodiment is not particularly restricted, and may be various structures such as a flat structure, a rectangular structure and a cylindrical structure. An example of the flat nonaqueous electrolyte battery is shown in FIGS. 1 to 3.

As shown in FIG. 1, an electrode group 1 has a structure in which a positive electrode 2 and a negative electrode 3 are coiled in a flat shape with interposition of a separator 4 between the electrodes. The electrode group 1 is manufactured by applying hot-press after coiling the positive electrode 2 and negative electrode 3 with interposition of the separator 4 therebetween. The positive electrode 2, negative electrode 3 and separator 4 in the electrode group 1 may be integrated with an adhesive polymer. A belt-like positive electrode terminal 5 is electrically connected to the positive electrode 2, while a belt-like negative electrode terminal 6 is electrically connected to the negative electrode 3. The electrode group 1 is housed in a laminate film case 7 having heat-seal portions on three edges. The tips of the positive electrode terminal 5 and negative electrode terminal 6 are pulled out from the shorter edge of the heat seal portion of the case 7.

While the tips of the positive electrode terminal 5 and negative electrode terminal 6 are pulled out from the same heat seal portion (seal portion) of the case 7, the heat seal portion from which the positive electrode terminal 5 is pulled out may be different from the heat seal portion from which the negative electrode terminal 6 is pulled out. A specific example of the structure is shown in FIGS. 2 and 3.

Figure 2:
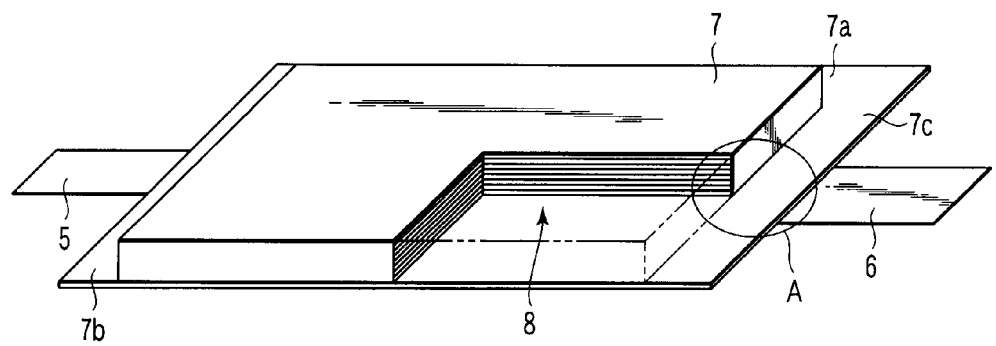
FIG. 2 is a partially cut perspective view showing another nonaqueous electrolyte battery according to the first embodiment.
Figure 3:
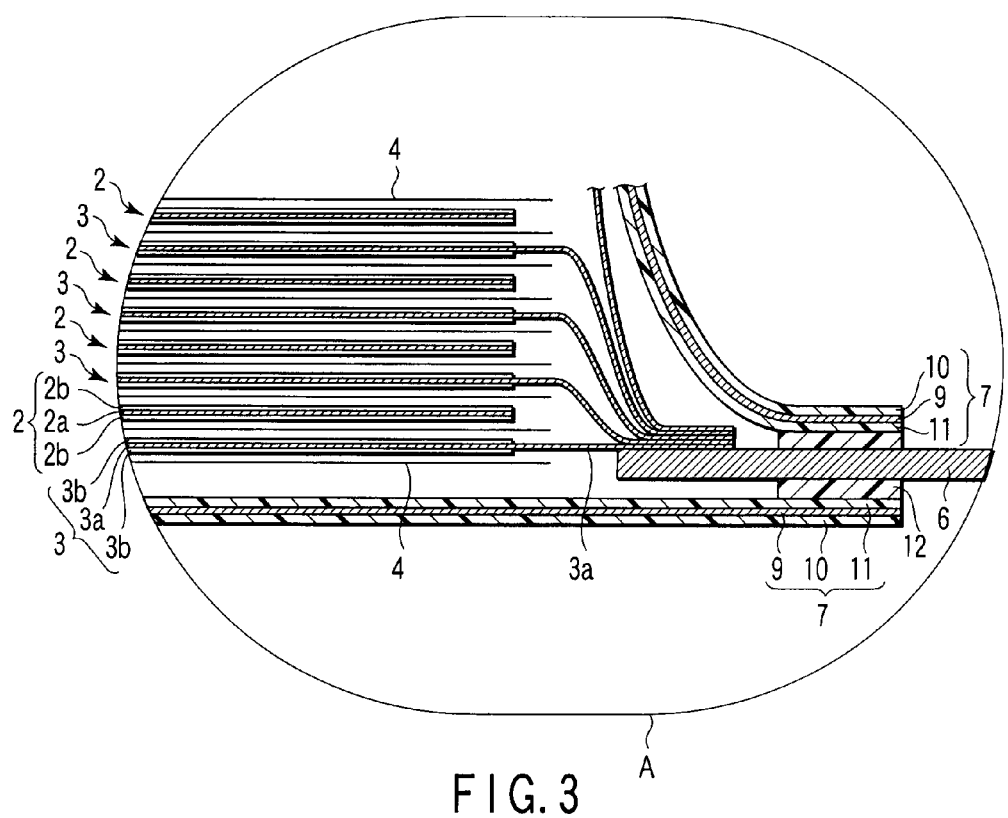
FIG. 3 is a schematic illustration of a magnified cross section of a main part of an electrode group of the nonaqueous electrolyte battery shown in FIG. 2.

As shown in FIG. 2, a laminated electrode group 8 is housed in the case 7 made of the laminate film. As show in FIG. 3, the laminate film comprises, for example, a resin layer 10, a thermoplastic resin layer 11, and a metal layer 9 disposed between the resin layer 10 and thermoplastic resin layer 11. The thermoplastic resin layer 11 is located on the inner surface of the case 7. Heat-seal portions 7a, 7b and 7c are formed by thermal adhesion of the thermoplastic resin layer 11 at one longer edge and both shorter edges of the case 7 made of the laminate film. The case 7 is sealed with the heat-seal portions 7a, 7b and 7c. The laminated electrode group 8 has a structure in which the positive electrodes 2 and negative electrodes 3 are alternately laminated with interposition of the separators 4 between them. Plural positive electrodes 2 are used, and each electrode comprises a positive electrode current collector 2a and positive electrode active material layers 2b laminated on both surfaces of the positive electrode current collector 2a. Plural negative electrodes 3 are used, and each electrode comprises a negative electrode current collector 3a and negative electrode active material layers 3b laminated on both surfaces of the negative electrode current collector 3a. One edge of the negative electrode current collector 3a of the negative electrode 3 is protruded out of the positive electrode 2. The negative electrode current collector 3a protruded out of the positive electrode 2 is electrically connected to the belt-like negative electrode terminal 6. The tip of the belt-like negative electrode terminal 6 is pulled out to the outside through the heat seal portion 7c of the case 7. Both surfaces of the negative electrode terminal 6 are opposed to the thermoplastic resin layers 11 that constitute the heat seal portion 7c. An insulation film 12 is inserted between each surface of the negative electrode terminal 6 and the thermoplastic resin layer 11 for improving the bonding strength between the heat seal portion 7c and the negative electrode terminal 6. An example of the insulation film 12 is a film formed of a material prepared by adding an acid anhydride to a polyolefin that contains at least one of polypropylene and polyethylene. The edge of the positive electrode current collector 2a of the positive electrode 2 is protruded out of the negative electrode 3, although this configuration is not illustrated in the drawing. The edge of the positive electrode current collector 2a is positioned at an opposed side to the protruded edge of the negative electrode current collector 3a, The positive electrode current collector 2a protruded out of the negative electrode 3 is electrically connected to the belt-like positive electrode terminal 5. The tip of the belt-like positive electrode terminal 5 is pulled out through the heat seal portion 7b of the case 7. The insulation film 12 is interposed between the positive electrode terminal 5 and the thermoplastic resin layer 11 for improving bonding strength between the heat seal portion 7b and the positive electrode terminal 5. The direction in which the positive electrode terminal 5 is pulled out of the case 7 is opposed to the direction in which the negative electrode terminal 6 is pulled out of the case 7, as is evident from the above-described construction.

As shown in FIGS. 2 and 3, a nonaqueous electrolyte battery favorable for use under a large load current may be provided by providing the pull-out direction of the positive electrode terminal 5 so as to be opposed to the pull-out direction of the negative electrode terminal 6.

The positive electrode terminal, the negative electrode terminal and the case will be described below.

The positive electrode terminal may be formed of a conductive material having electric stability at the potential with respect to the lithium metal in the range of 3 to 5 V. Specific examples of the material include aluminum alloys containing Mg, Ti, Zn, Mn, Fe, Cu or Si. The same material as that of the positive electrode current collector is preferably used for the positive electrode terminal for reducing contact resistance.

The negative electrode terminal may be formed of a conductive material having electric stability at the potential with respect to the lithium metal in the range of 0.4 to 3 V. Specific examples of the material include aluminum alloys containing Mg, Ti, Zn, Mn, Fe, Cu or Si. The same material as that of the negative electrode current collector is preferably used for the negative electrode terminal for reducing contact resistance.

A multilayer film comprising a metal foil covered with a resin film may be used for the laminate film constituting the case. The resin available includes polymer films such as polypropylene (PP) film, polyethylene (PE) film, nylon film or polyethylene terephthalate (PET) film. As shown in FIG. 2 above, polypropylene (PP) or polyethylene (PE) may be used as a thermoplastic resin when one of the resin films is formed of the thermoplastic resin. The metal foil can be formed of aluminum or an aluminum alloy. The thickness of the laminate film is desirably 0.2 mm or less.

While the case made of the laminate film is used in FIGS. 1 to 3, the material of the case is not particularly restricted and, for example, a case made of a metal with a thickness of 0.5 mm or less may be used. The metal case available is a rectangular or cylindrical metal can made of aluminum, an aluminum alloy, iron or stainless steel. The thickness of the metal case is desirably 0.2 mm or less.

The aluminum alloy constituting the metal case is preferably an alloy containing elements such as magnesium, zinc and silicon. However, the content of transition metals such as iron, copper, nickel and chromium is preferably 1% or less. This composition permits long term reliability under a high temperature environment and heat dissipating ability to be remarkably improved.

The metal can made of aluminum or an aluminum alloy preferably has an average crystal grain size of 50 µm or less, more preferably 30 µm or less, and further preferably 5 µm or less. The strength of the metal can made of aluminum or an aluminum alloy can be remarkably increased by controlling the average crystal grain size to be 50 µm or less to enable the can to be thin. Consequently, a vehicle-mounted battery that is light weight, shows high output power and is excellent in long term reliability can be realized.

Figure 4:
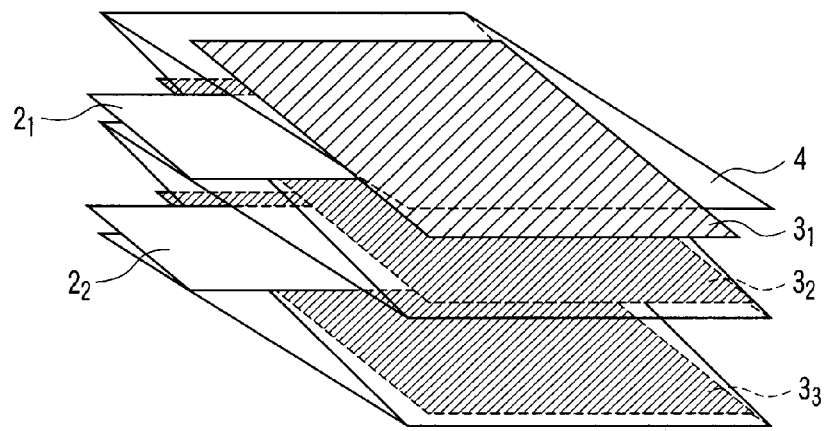
FIG. 4 is a schematic perspective view of the stacking type electrode group used in the nonaqueous electrolyte battery according to the first embodiment.

Examples of the electrode group is the coiled structure shown in FIG. 1, or the laminate structure shown in FIGS. 2 and 3. The structure of the electrode group is preferably a laminated structure in order to endow the battery with excellent input-output characteristics as well as high safety and reliability. The electrode group including the positive electrode and negative electrode preferably has a laminated structure in which the separator is used by folding it into a zigzag shape as shown in FIG. 4 for improving a large load current performance during a long term use. The strip-shaped separator 4 is also folded into a zigzag shape. A strip $3_1$ of the negative electrode is laminated on the uppermost layer of the separator 4 folded into a zigzag shape. A strip $2_1$ of the positive electrode, a strip $3_2$ of the negative electrode, a strip $2_2$ of the positive electrode and a strip $3_3$ of the negative electrode are sequentially inserted into the respective overlap portions of the separators 4 from the top in this order. The electrode group having the laminated structure is obtained by alternately disposing the positive electrodes 2 and negative electrodes 3 between the separators 4 folded into a zigzag shape.

The nonaqueous electrolyte can be smoothly supplied to the electrode by folding the separator into a zigzag shape since respective three edges of the positive electrode and negative electrode are able to directly contact the nonaqueous electrolyte without intervention of the separator. Accordingly, the nonaqueous electrolyte is smoothly supplied to the electrode even when the nonaqueous electrolyte is consumed on the surface of the electrode during a long term use, and excellent large load current characteristics (input-output characteristics) may be realized for a long period of time.

Second Embodiment

A battery pack according to a second embodiment comprises a plurality of nonaqueous electrolyte batteries according to the first embodiment. The nonaqueous electrolyte battery of the first embodiment is used as a unit cell, and the plural unit cells are desirably connected in series or in parallel to construct a battery module.

The nonaqueous electrolyte battery of the first embodiment is suitable for use as the battery module, while the battery pack of the second embodiment is excellent in cycle performance. These embodiments will be described below.

The surface of the active material can easily come in contact with the nonaqueous electrolyte by improving impregnating ability of the nonaqueous electrolyte at the positive or negative electrode, and the lithium ion concentration in the active material can be readily evened. Consequently, the unit cell hardly suffers from over-voltage, namely, the active material can be evenly utilized since local over-charge and over-discharge hardly occur. Therefore, individual difference of the capacity of the unit cell and individual difference of impedance can be reduced. As a result, fluctuation of the voltage of the unit cell at a fully charged state due to individual difference of the capacity can be reduced, for example, in the battery module in which the unit cells are connected in series. Accordingly, the battery pack of the second embodiment is excellent in controllability of the battery module with improved cycle performance.

Figure 6:
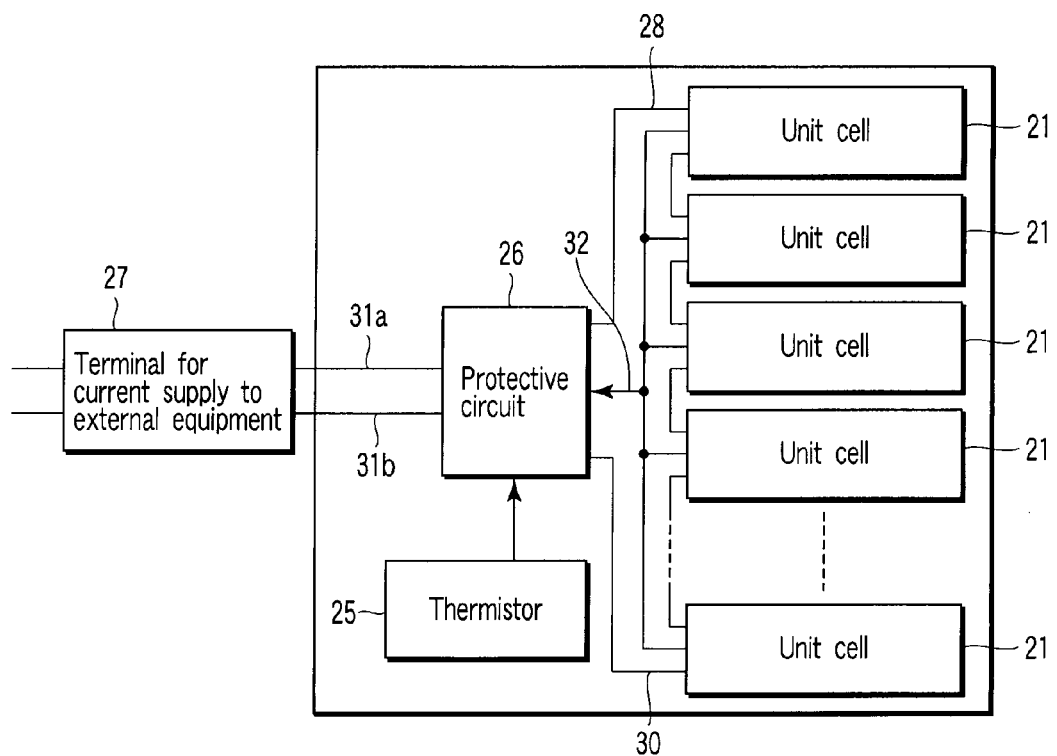
FIG. 6 is a block diagram showing an electric circuit of the battery pack shown in FIG. 5.
Figure 5:
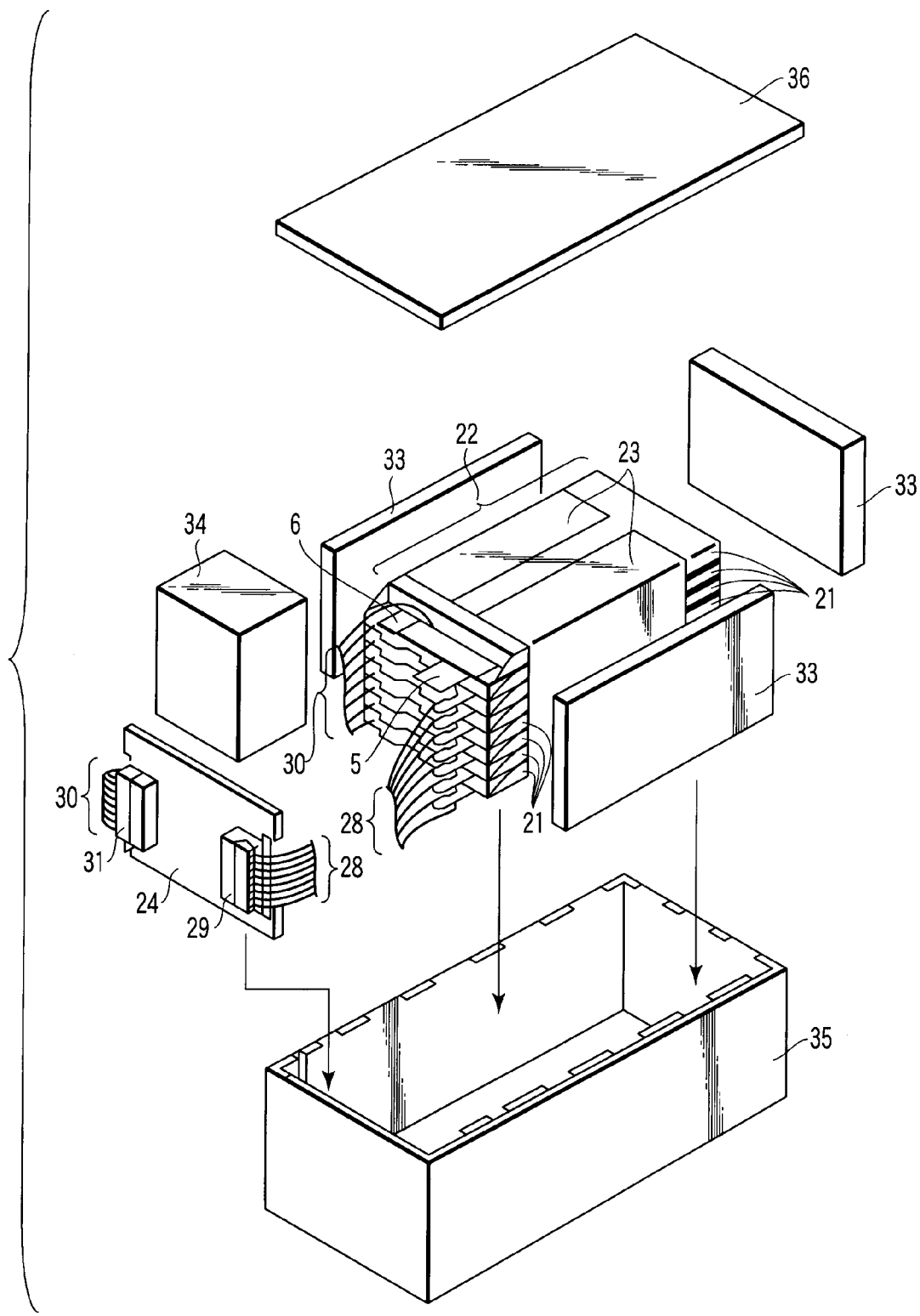
FIG. 5 is an exploded perspective view of the battery pack according to a second embodiment.

Each of a plurality of unit cells 21 included in the battery pack shown in FIG. 5 is formed of, though not limited to, a flattened type nonaqueous electrolyte battery constructed as shown in FIG. 1. It is possible to use the flattened type nonaqueous electrolyte battery shown in FIGS. 2 and 3 as the unit cell 21. The plural unit cells 21 are stacked one upon the other in the thickness direction in a manner to align the protruding directions of the positive electrode terminals 5 and the negative electrode terminals 6. As shown in FIG. 6, the unit cells 21 are connected in series to form a battery module 22. The unit cells 21 forming the battery module 22 are made integral by using an adhesive tape 23 as shown in FIG. 5.

A printed wiring board 24 is arranged on the side surface of the battery module 22 toward which protrude the positive electrode terminals 5 and the negative electrode terminals 6. As shown in FIG. 6, a thermistor 25, a protective circuit 26 and a terminal 27 for current supply to the external equipment are connected to the printed wiring board 24.

As shown in FIGS. 5 and 6, a wiring 28 on the side of the positive electrodes of the battery module 22 is electrically connected to a connector 29 on the side of the positive electrode of the protective circuit 26 mounted to the printed wiring board 24. On the other hand, a wiring 30 on the side of the negative electrodes of the battery module 22 is electrically connected to a connector 31 on the side of the negative electrode of the protective circuit 26 mounted to the printed wiring board 24.

The thermistor 25 detects the temperature of the unit cell 21 and transmits the detection signal to the protective circuit 26. The protective circuit 26 is capable of breaking a wiring 31a on the positive side and a wiring 31b on the negative side, the wirings 31a and 31b being stretched between the protective circuit 26 and the terminal 27 for current supply to the external equipment. These wirings 31a and 31b are broken by the protective circuit 26 under prescribed conditions including, for example, the conditions that the temperature detected by the thermistor is higher than a prescribed temperature, and that the over-charging, over-discharging and over-current of the unit cell 21 have been detected. The detecting method is applied to the unit cells 21 or to the battery module 22. In the case of applying the detecting method to each of the unit cells 21, it is possible to detect the battery voltage, the positive electrode potential or the negative electrode potential. On the other hand, where the positive electrode potential or the negative electrode potential is detected, lithium metal electrodes used as reference electrodes are inserted into the unit cells 21.

In the case of FIG. 6, a wiring 32 is connected to each of the unit cells 21 for detecting the voltage, and the detection signal is transmitted through these wirings 32 to the protective circuit 26.

Protective sheets 33 each formed of rubber or resin are arranged on the three of the four sides of the battery module 22, though the protective sheet 33 is not arranged on the side toward which protrude the positive electrode terminals 5 and the negative electrode terminals 6. A protective block 34 formed of rubber or resin is arranged in the clearance between the side surface of the battery module 22 and the printed wiring board 24.

The battery module 22 is housed in a container 35 together with each of the protective sheets 33, the protective block 34 and the printed wiring board 24. To be more specific, the protective sheets 33 are arranged inside the two long sides of the container 35 and inside one short side of the container 35. On the other hand, the printed wiring board 24 is arranged along that short side of the container 35 which is opposite to the short side along which one of the protective sheets 33 is arranged. The battery module 22 is positioned within the space surrounded by the three protective sheets 33 and the printed wiring board 24. Further, a lid 36 is mounted to close the upper open edge of the container 35.

Incidentally, it is possible to use a thermally shrinkable tube in place of the adhesive tape 23 for fixing the battery module 22. In this case, the protective sheets 33 are arranged on both sides of the battery module 22 and, after the thermally shrinkable tube is wound about the protective sheets, the tube is thermally shrunk to fix the battery module 22.

The unit cells 21 shown in FIGS. 5 and 6 are connected in series. However, it is also possible to connect the unit cells 21 in parallel to increase the cell capacity. Of course, it is possible to connect the battery packs in series and in parallel.

Also, the embodiments of the battery pack can be changed appropriately depending on the use of the battery pack.

The battery pack according to the second embodiment is preferably used when good cycle performance is required at a large load current (high current density). Specifically, the battery pack is used for power sources of digital cameras, vehicle-mounted batteries for two-wheel or four-wheel hybrid electric cars, two-wheel or four-wheel electric cars and electric mopeds, and power sources of rechargeable vacuum cleaners. Since the battery pack according to this embodiment has a high effect for preventing the active material layer from being peeled from the current collector due to expansion and contraction resulting from cycles of deep charge and deep discharge, the battery pack is suitable for use in the rechargeable vacuum cleaner and vehicle.

Third Embodiment

A vehicle according to a third embodiment of the present invention comprises the battery pack according to the second embodiment. The vehicle noted above includes, for example, a hybrid electric automobile having 2 to 4 wheels, an electric automobile having 2 to 4 wheels, and an electric moped.

Figure 7:
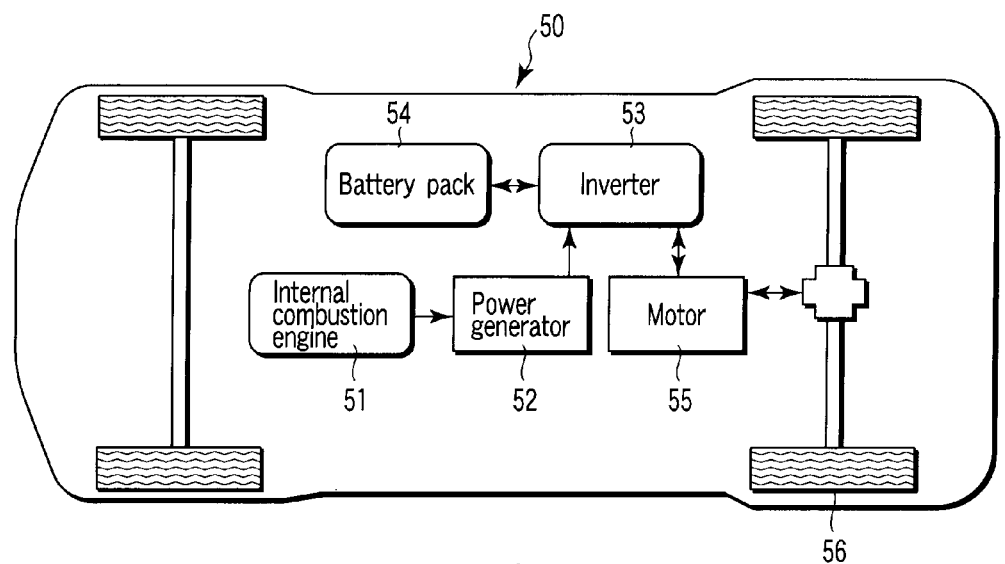
FIG. 7 is a schematic illustration of a series hybrid car according to a third embodiment.
Figure 8:
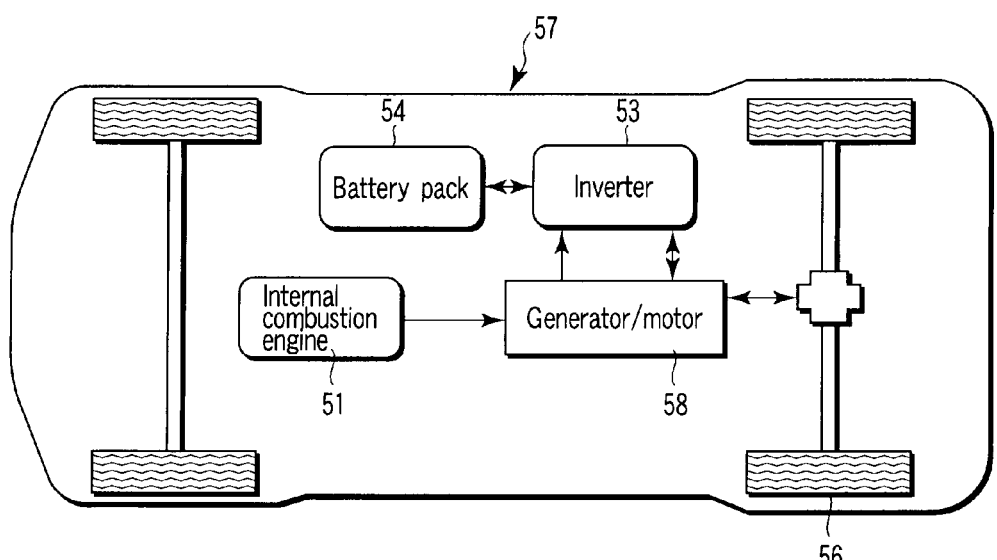
FIG. 8 is a schematic illustration of a parallel hybrid car according to the third embodiment.
Figure 9:
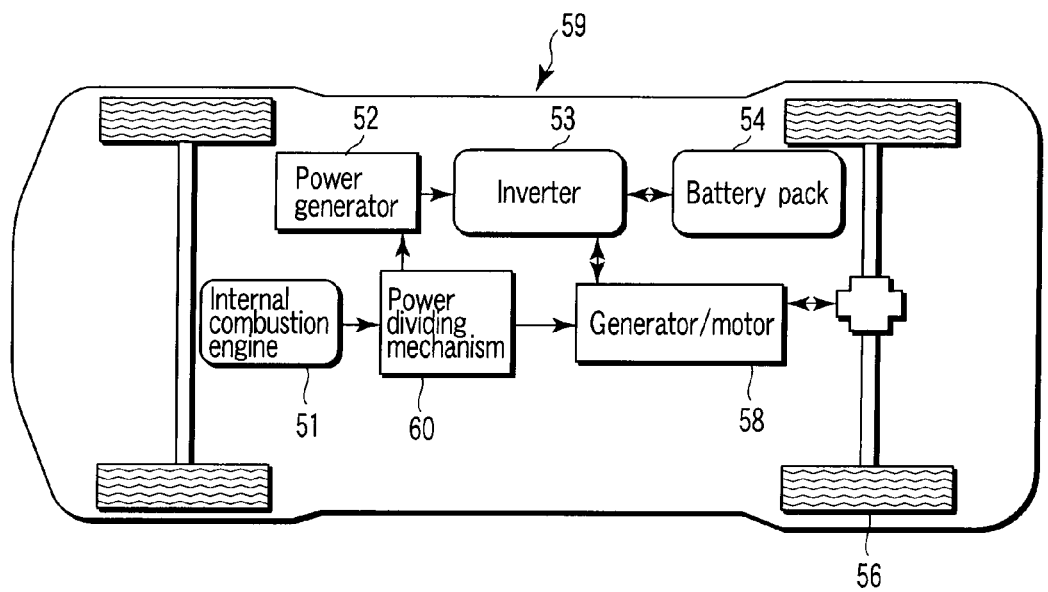
FIG. 9 is a schematic illustration of a series-parallel hybrid car according to the third embodiment.

FIGS. 7 to 9 show various type of hybrid vehicles in which an internal combustion engine and a motor driven by a battery pack are used in combination as the power source for the driving. For driving the vehicle, required is the power source exhibiting a wide range of the rotation speed and the torque depending on the running conditions of the vehicle. Since the torque and the rotation speed exhibiting an ideal energy efficiency are limited in the internal combustion engine, the energy efficiency is lowered under the driving conditions other than the limited torque and the rotation speed. Since the hybrid vehicle includes the internal combustion engine and the electric motor, it is possible to improve the energy efficiency of the vehicle. Specifically, the internal combustion engine is operated under the optimum conditions so as to generate an electric power, and the wheels are driven by a high-efficiency electric motor, or the internal combustion engine and the electric motor are operated simultaneously, thereby improving the energy efficiency of the vehicle. Also, by recovering the kinetic energy of the vehicle in the decelerating stage as the electric power, the running distance per unit amount of the fuel can be drastically increased, compared with the vehicle that is driven by the internal combustion engine alone.

The hybrid vehicle can be roughly classified into three types depending on the combination of the internal combustion engine and the electric motor.

FIG. 7 shows a hybrid vehicle 50 that is generally called a series hybrid vehicle. The motive power of an internal combustion engine 51 is once converted entirely into an electric power by a power generator 52, and the electric power thus converted is stored in a battery pack 54 via an inverter 53. The battery pack according to the second embodiment is used as the battery pack 54. The electric power stored in the battery pack 54 is supplied to an electric motor 55 via the inverter 53, with the result that wheels 56 are driven by the electric motor 55. In other words, the hybrid vehicle 50 shown in FIG. 7 represents a system in which a power generator is incorporated into an electric vehicle. The internal combustion engine can be operated under highly efficient conditions and the kinetic energy of the internal combustion engine can be recovered as the electric power. On the other hand, the wheels are driven by the electric motor alone and, thus, the hybrid vehicle 50 requires an electric motor of a high output. It is also necessary to use a battery pack having a relatively large capacity. It is desirable for the rated capacity of the battery pack to fall within a range of 5 to 50 Ah, more desirably 10 to 20 Ah. Incidentally, the rated capacity noted above is the capacity at the time when the battery pack is discharged at a rate of 0.2 C.

FIG. 8 shows the construction of a hybrid vehicle 57 that is called a parallel hybrid vehicle. A reference numeral 58 shown in FIG. 8 denotes an electric motor that also acts as a power generator. The internal combustion engine 51 drives mainly the wheels 56. The motive power of the internal combustion engine 51 is converted in some cases into an electric power by the power generator 58, and the battery pack 54 is charged by the electric power produced from the power generator 58. In the starting stage or the accelerating stage at which the load is increased, the driving force is supplemented by the electric motor 58. The hybrid vehicle 57 shown in FIG. 8 represents a system based on the ordinary vehicle. In this system, the fluctuation in the load of the internal combustion engine 51 is suppressed so as to improve the efficiency, and the regenerative power is also obtained. Since the wheels 56 are driven mainly by the internal combustion engine 51, the output of the electric motor 58 can be determined arbitrarily depending on the required ratio of the assistance. The system can be constructed even in the case of using a relatively small electric motor 58 and a relatively small battery pack 54. The rated capacity of the battery pack can be set to fall within a range of 1 to 20 Ah, more desirably 5 to 10 Ah.

FIG. 9 shows the construction of a hybrid vehicle 59 that is called a series-parallel hybrid vehicle, which utilizes in combination both the series type system and the parallel type system. A power dividing mechanism 60 included in the hybrid vehicle 59 divides the output of the internal combustion engine 51 into the energy for the power generation and the energy for the wheel driving. The series-parallel hybrid vehicle 59 permits controlling the load of the engine more finely than the parallel hybrid vehicle so as to improve the energy efficiency.

It is desirable for the rated capacity of the battery pack to fall within a range of 1 to 20 Ah, more desirably 5 to 10 Ah.

It is desirable for the nominal voltage of the battery pack included in the hybrid vehicles as shown in FIGS. 7 to 9 to fall within a range of 200 to 600 V.

The battery pack according to embodiments of the present invention is adapted for use in the series-parallel hybrid vehicle.

Figure 10:
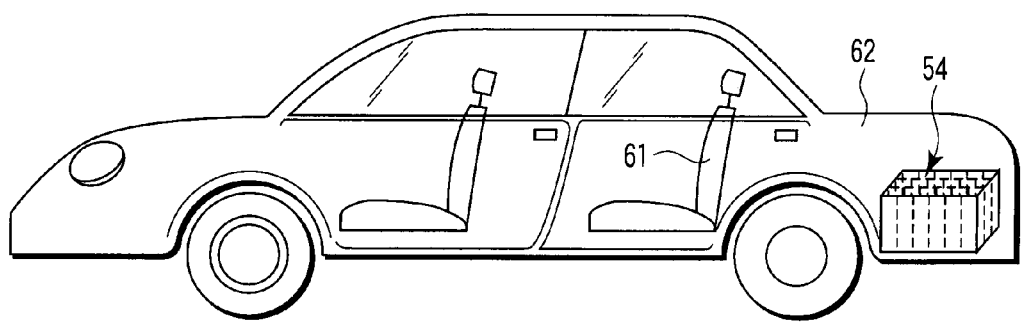
FIG. 10 is a schematic illustration of an automobile according to the third embodiment.

It is desirable for the battery pack 54 to be arranged in general in the site where the battery pack 54 is unlikely to be affected by the change in the temperature of the outer atmosphere and unlikely to receive an impact in the event of a collision. In, for example, a sedan type automobile shown in FIG. 10, the battery pack 54 can be arranged within a trunk room rearward of a rear seat 61. The battery pack 54 can also be arranged below or behind the rear seat 61. Where the battery has a large weight, it is desirable to arrange the battery pack 54 below the seat or below the floor in order to lower the center of gravity of the vehicle.

An electric vehicle (EV) is driven by the energy stored in the battery pack that is charged by the electric power supplied from outside the vehicle. Therefore, it is possible for the electric vehicle to utilize the electric energy generated at a high efficiency by, for example, another power generating equipment. Also, since the kinetic energy of the vehicle can be recovered as the electric power in the decelerating stage of the vehicle, it is possible to improve the energy efficiency during the driving of the vehicle. It should also be noted that the electric vehicle does not discharge at all the waste gases such as a carbon dioxide gas and, thus, the air pollution problem need not be worried about at all. On the other hand, since all the power required for the driving of the vehicle is produced by an electric motor, it is necessary to use an electric motor of a high output. In general, it is necessary to store all the energy required for one driving in the battery pack by one charging. It follows that it is necessary to use a battery pack having a very large capacity. It is desirable for the rated capacity of the battery pack to fall within a range of 100 to 500 Ah, more desirably 200 to 400 Ah.

The weight of the battery pack occupies a large ratio of the weight of the vehicle. Therefore, it is desirable for the battery pack to be arranged in a low position that is not markedly apart from the center of gravity of the vehicle. For example, it is desirable for the battery pack to be arranged below the floor of the vehicle. In order to allow the battery pack to be charged in a short time with a large amount of the electric power required for the one driving, it is necessary to use a charger of a large capacity and a charging cable. Therefore, it is desirable for the electric vehicle to be equipped with a charging connector connecting the charger and the charging cable. A connector utilizing the electric contact can be used as the charging connector. It is also possible to use a non-contact type charging connector utilizing the inductive coupling.

Figure 11:
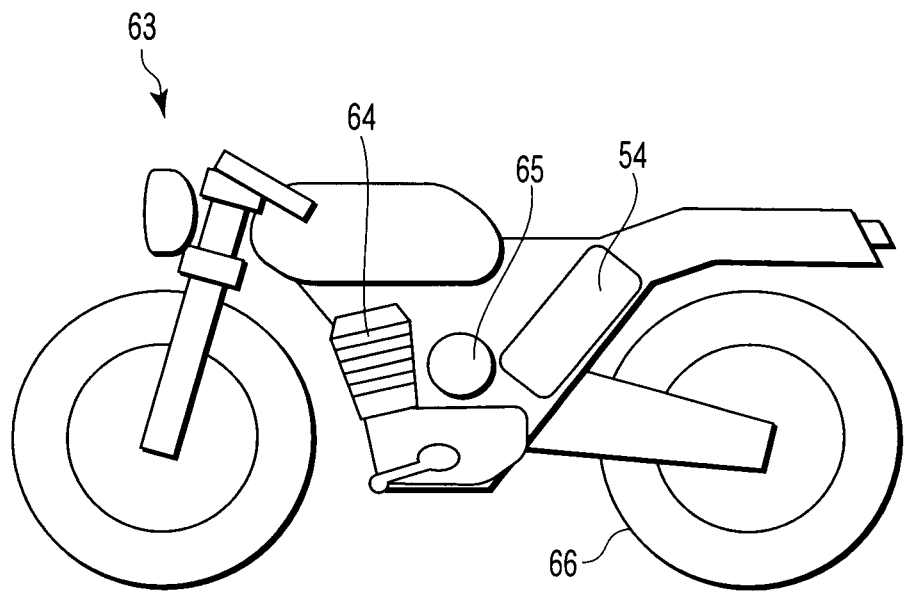
FIG. 11 is a schematic illustration of a hybrid motorcycle according to the third embodiment.

FIG. 11 exemplifies the construction of a hybrid motor bicycle 63. It is possible to construct a hybrid motor bicycle 63 exhibiting a high energy efficiency and equipped with an internal combustion engine 64, an electric motor 65, and the battery pack 54 like the hybrid vehicle. The internal combustion engine 64 drives mainly the wheels 66. In some cases, the battery pack 54 is charged by utilizing a part of the motive power generated from the internal combustion engine 64. In the starting stage or the accelerating stage in which the load of the motor bicycle is increased, the driving force of the motor bicycle is supplemented by the electric motor 65. Since the wheels 66 are driven mainly by the internal combustion engine 64, the output of the electric motor 65 can be determined arbitrarily based on the required ratio of the supplement. The electric motor 65 and the battery pack 54, which are relatively small, can be used for constructing the system. It is desirable for the rated capacity of the battery pack to fall within a range of 1 to 20 Ah, more desirably 3 to 10 Ah.

Figure 12:
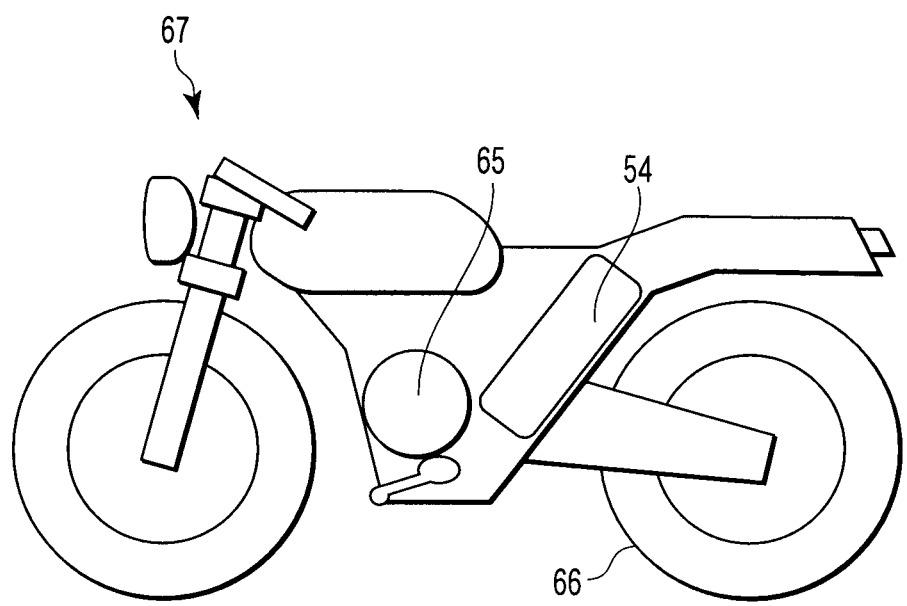
FIG. 12 is a schematic illustration of an electric motorcycle according to the third embodiment.

FIG. 12 exemplifies the construction of an electric motor bicycle 67. The electric motor bicycle 67 is driven by the energy stored in the battery pack 54 that is charged by the supply of the electric power from the outside. Since all the driving force required for the driving the motor bicycle 67 is generated from the electric motor 65, it is necessary to use the electric motor 65 of a high output. Also, since it is necessary for the battery pack to store all the energy required for one driving by one charging, it is necessary to use a battery pack having a relatively large capacity. It is desirable for the rated capacity of the battery pack to fall within a range of 10 to 50 Ah, more desirably 15 to 30 Ah.

Fourth Embodiment

FIGS. 13 and 14 show an example of a rechargeable vacuum cleaner according to a fourth embodiment. The rechargeable vacuum cleaner comprises an operating panel 75 which selects operation modes, an electrically driven blower 74 comprising a fun motor for generating suction power for dust collection, and a control circuit 73. A battery pack 72 according to the second embodiment as a power source for driving these units are housed in a casing 70. When the battery pack is housed in such a portable device, the battery pack is desirably fixed with interposition of a buffer material in order to prevent the battery pack from being affected by vibration. Known technologies may be applied for maintaining the battery pack at an appropriate temperature. While a battery charger 71 that also serves as a setting table functions as the battery charger of the battery pack according to the second embodiment, a part or all of the function of the battery charger may be housed in the casing 70.

While the rechargeable vacuum cleaner consumes a large electric power, the rated capacity of the battery pack is desirably in the range of 2 to 10 Ah, more preferably 2 to 4 Ah, in terms of portability and operation time. The nominal voltage of the battery pack is desirably in the range of 40 to 80 V.

Examples of the invention will be described in detail with reference to drawings.

Example 1

Manufacture of Positive Electrode $LiCoO_2$ was used as the positive electrode active material, and a graphite powder was blended as a conductive agent in a proportion of 8% by weight relative to the total weight of the positive electrode while PVdF was blended as a binder in a proportion of 5% by weight relative to the total weight of the positive electrode. A slurry was prepared by dispersing these materials in N-methyl pyrrolidone (NMP). The slurry obtained was applied on an aluminum foil with a thickness of 15 μm and an average crystal grain size of 4 μm, followed by drying and pressing to manufacture a positive electrode with an electrode density of 3.3 g/cm³.

<Manufacture of Negative Electrode>

$Li_4Ti_5O_{12}$ particles with an average particle diameter of 0.90 μm and a true density $\rho_1$ of 3.23 g/cm³ were prepared as the first negative electrode active material particles. $Li_4Ti_5O_{12}$ particles with an average particle diameter of 3.40 μm and a true density $\rho_2$ of 3.28 g/cm³ were also prepared as the second negative electrode active material particles. The difference in the true densities ($\rho_2-\rho_1$) is 0.05 g/cm³. A slurry was prepared by mixing 85 parts by weight of the first negative electrode active material particles, 5 parts by weight of the second negative electrode active material particles and 10 parts by weight of PVdF as a binder in N-methyl pyrrolidone. The slurry obtained was applied on an aluminum foil with a thickness of 15 μm and an average crystal grain size of 4 μm, followed by drying and pressing to manufacture a negative electrode. The ($F_1/F_2$) value of this negative electrode was 6.91.

<Preparation of Nonaqueous Electrolyte>

EC, PC and GLB were mixed in a volume ratio (EC:PC:GLB) of 1:1:4, and a nonaqueous electrolyte was prepared by dissolving $LiBF_4$ in the mixed solvent at a concentration of 2 M.

<Assembly of Battery>

After impregnating a separator made of a polyethylene porous film with the nonaqueous electrolyte, the positive electrode was covered with the separator. A coiled electrode group was manufactured by coiling the positive electrode, the negative electrode and the separator so that the negative electrode faces the positive electrode with interposition of the separator. The electrode group was formed into a flat shape by pressing. The flat-shaped electrode group was inserted into a case made of an aluminum-containing laminate film with a thickness of 0.1 mm, and a flat-type nonaqueous electrolyte battery with a thickness of 3.0 mm, a width of 35 mm and a height of 62 mm as shown in FIG. 1 was manufactured.

The battery obtained was subjected to a cycle test in which a charging until the battery voltage of 2.7 V at a charge rate of 1 C at 45° C. and a discharging until the battery voltage of 1.5 V at a discharge rate of 1 C are performed repeatedly. The result showed that the cycle performance was excellent since the battery capacity reached 80% of the first cycle discharge capacity at 1539 cycles.

Examples 2 to 36 and Comparative Examples 1 to 6

The battery was manufactured by the same method as in Example 1, except that the construction of the negative electrode or nonaqueous electrolyte was changed as shown in Tables 1 to 5.

TABLE 1

|  | First negative electrode active material particles (Particle diameter [μm]) (specific surface area [g/m²]) (true density [g/cm³]) | Second negative electrode active material particles (Particle diameter [μm]) (true density [g/cm³]) | Difference in true density ($\rho_2 - \rho_1$) | Peak frequency ratio ($F_1/F_2$) | Nonaqueous electrolyte |
|---|---|---|---|---|---|
| Example 1 | $Li_4Ti_5O_{12}$ (0.90 μm) (8.1 g/m²) (3.23 g/cm³) | $Li_4Ti_5O_{12}$ (3.40 μm) (3.28 g/cm³) | 0.05 | 6.91 | 2M-$LiBF_4$/EC + PC + GBL(1:1:4) |
| Example 2 | $Li_4Ti_5O_{12}$ (0.93 μm) (7.1 g/m²) (3.22 g/cm³) | $Li_4Ti_5O_{12}$ (3.40 μm) (3.28 g/cm³) | 0.06 | 6.83 | 2M-$LiBF_4$/EC + PC + GBL(1:1:4) |
| Example 3 | $Li_4Ti_5O_{12}$ (0.85 μm) (20.2 g/m²) (3.22 g/cm³) | $Li_4Ti_5O_{12}$ (3.40 μm) (3.28 g/cm³) | 0.06 | 6.88 | 2M-$LiBF_4$/EC + PC + GBL(1:1:4) |

TABLE 1-continued

| | First negative electrode active material particles (Particle diameter [μm]) (specific surface area [g/m$^2$]) (true density [g/cm$^3$]) | Second negative electrode active material particles (Particle diameter [μm]) (true density [g/cm$^3$]) | Difference in true density ($\rho_2 - \rho_1$) | Peak frequency ratio ($F_1/F_2$) | Nonaqueous electrolyte |
|---|---|---|---|---|---|
| Example 4 | Li$_4$Ti$_5$O$_{12}$ (0.78 μm) (48.8 g/m$^2$) (3.24 g/cm$^3$) | Li$_4$Ti$_5$O$_{12}$ (3.40 μm) (3.28 g/cm$^3$) | 0.04 | 6.94 | 2M-LiBF$_4$/EC + PC + GBL(1:1:4) |
| Example 5 | Li$_4$Ti$_5$O$_{12}$ (0.67 μm) (99.2 g/m$^2$) (3.25 g/cm$^3$) | Li$_4$Ti$_5$O$_{12}$ (3.40 μm) (3.28 g/cm$^3$) | 0.03 | 6.91 | 2M-LiBF$_4$/EC + PC + GBL(1:1:4) |
| Example 6 | Li$_4$Ti$_5$O$_{12}$ (0.90 μm) (8.1 g/m$^2$) (3.23 g/cm$^3$) | Li$_4$Ti$_5$O$_{12}$ (3.39 μm) (3.24 g/cm$^3$) | 0.01 | 6.87 | 2M-LiBF$_4$/EC + PC + GBL(1:1:4) |
| Example 7 | Li$_4$Ti$_5$O$_{12}$ (0.90 μm) (8.1 g/m$^2$) (3.23 g/cm$^3$) | Li$_4$Ti$_5$O$_{12}$ (3.55 μm) (4.23 g/cm$^3$) | 1.00 | 6.90 | 2M-LiBF$_4$/EC + PC + GBL(1:1:4) |
| Example 8 | Li$_4$Ti$_5$O$_{12}$ (0.90 μm) (8.1 g/m$^2$) (3.23 g/cm$^3$) | Li$_4$Ti$_5$O$_{12}$ (3.93 μm) (5.61 g/cm$^3$) | 2.38 | 6.92 | 2M-LiBF$_4$/EC + PC + GBL(1:1:4) |
| Example 9 | Li$_4$Ti$_5$O$_{12}$ (0.90 μm) (8.1 g/m$^2$) (3.23 g/cm$^3$) | Li$_4$Ti$_5$O$_{12}$ (3.40 μm) (3.28 g/cm$^3$) | 0.05 | 2.21 | 2M-LiBF$_4$/EC + PC + GBL(1:1:4) |
| Example 10 | Li$_4$Ti$_5$O$_{12}$ (0.90 μm) (8.1 g/m$^2$) (3.23 g/cm$^3$) | Li$_4$Ti$_5$O$_{12}$ (3.40 μm) (3.28 g/cm$^3$) | 0.05 | 5.08 | 2M-LiBF$_4$/EC + PC + GBL(1:1:4) |

TABLE 2

| | First negative electrode active material particles (Particle diameter [μm]) (specific surface area [g/m$^2$]) (true density [g/cm$^3$]) | Second negative electrode active material particles (Particle diameter [μm]) (true density [g/cm$^3$]) | Difference in true density ($\rho_2 - \rho_1$) | Peak frequency ratio ($F_1/F_2$) | Nonaqueous electrolyte |
|---|---|---|---|---|---|
| Example 11 | Li$_4$Ti$_5$O$_{12}$ (0.90 μm) (8.1 g/m$^2$) (3.23 g/cm$^3$) | Li$_4$Ti$_5$O$_{12}$ (3.40 μm) (3.28 g/cm$^3$) | 0.05 | 14.75 | 2M-LiBF$_4$/EC + PC + GBL(1:1:4) |
| Example 12 | Li$_4$Ti$_5$O$_{12}$ (0.90 μm) (8.1 g/m$^2$) (3.23 g/cm$^3$) | Li$_4$Ti$_5$O$_{12}$ (3.40 μm) (3.28 g/cm$^3$) | 0.05 | 19.80 | 2M-LiBF$_4$/EC + PC + GBL(1:1:4) |
| Example 13 | Li$_4$Ti$_5$O$_{12}$ (0.90 μm) (8.1 g/m$^2$) (3.23 g/cm$^3$) | Li$_4$Ti$_5$O$_{12}$ (2.13 μm) (3.26 g/cm$^3$) | 0.03 | 6.81 | 2M-LiBF$_4$/EC + PC + GBL(1:1:4) |
| Example 14 | Li$_4$Ti$_5$O$_{12}$ (0.90 μm) (8.1 g/m$^2$) (3.23 g/cm$^3$) | Li$_4$Ti$_5$O$_{12}$ (25.62 μm) (3.29 g/cm$^3$) | 0.06 | 6.72 | 2M-LiBF$_4$/EC + PC + GBL(1:1:4) |
| Example 15 | Li$_4$Ti$_5$O$_{12}$ (0.90 μm) (8.1 g/m$^2$) (3.23 g/cm$^3$) | Li$_4$Ti$_5$O$_{12}$ (48.12 μm) (3.31 g/cm$^3$) | 0.08 | 6.66 | 2M-LiBF$_4$/EC + PC + GBL(1:1:4) |
| Example 16 | Li$_4$Ti$_5$O$_{12}$ (0.90 μm) (8.1 g/m$^2$) (3.23 g/cm$^3$) | MnO$_2$ (3.36 μm) (4.02 g/cm$^3$) | 0.79 | 6.33 | 2M-LiBF$_4$/EC + PC + GBL(1:1:4) |
| Example 17 | Li$_4$Ti$_5$O$_{12}$ (0.90 μm) (8.1 g/m$^2$) (3.23 g/cm$^3$) | FeS (4.23 μm) (3.55 g/cm$^3$) | 0.32 | 6.45 | 2M-LiBF$_4$/EC + PC + GBL(1:1:4) |
| Example 18 | Li$_4$Ti$_5$O$_{12}$ (0.90 μm) (8.1 g/m$^2$) (3.23 g/cm$^3$) | FeS$_2$ (4.83 μm) (3.62 g/cm$^3$) | 0.39 | 6.91 | 2M-LiBF$_4$/EC + PC + GBL(1:1:4) |
| Example 19 | Li$_4$Ti$_5$O$_{12}$ (0.90 μm) (8.1 g/m$^2$) (3.23 g/cm$^3$) | CuO (5.23 μm) (4.82 g/cm$^3$) | 1.59 | 7.38 | 2M-LiBF$_4$/EC + PC + GBL(1:1:4) |
| Example 20 | Li$_4$Ti$_5$O$_{12}$ (0.90 μm) (8.1 g/m$^2$) (3.23 g/cm$^3$) | Cu$_4$O(PO$_4$)$_2$ (2.13 μm) (5.02 g/cm$^3$) | 1.79 | 7.21 | 2M-LiBF$_4$/EC + PC + GBL(1:1:4) |

TABLE 3

| | First negative electrode active material particles (Particle diameter [μm]) (specific surface area [g/m$^2$]) (true density [g/cm$^3$]) | Second negative electrode active material particles (Particle diameter [μm]) (true density [g/cm$^3$]) | Difference in true density ($\rho_2 - \rho_1$) | Peak frequency ratio ($F_1/F_2$) | Nonaqueous electrolyte |
|---|---|---|---|---|---|
| Example 21 | Li$_4$Ti$_5$O$_{12}$ (0.90 μm) (8.1 g/m$^2$) (3.23 g/cm$^3$) | MoO$_3$ (3.15 μm) (4.77 g/cm$^3$) | 1.54 | 6.13 | 2M-LiBF$_4$/EC + PC + GBL(1:1:4) |
| Example 22 | Li$_4$Ti$_5$O$_{12}$ (0.90 μm) (8.1 g/m$^2$) (3.23 g/cm$^3$) | TiO$_2$ (3.04 μm) (4.86 g/cm$^3$) | 1.53 | 6.08 | 2M-LiBF$_4$/EC + PC + GBL(1:1:4) |
| Example 23 | Li$_4$Ti$_5$O$_{12}$ (0.90 μm) (8.1 g/m$^2$) (3.23 g/cm$^3$) | Li$_4$Ti$_5$O$_{12}$ (3.40 μm) (3.28 g/cm$^3$) | 0.05 | 6.91 | 1.2M-LiPF$_6$/EC + MEC(1:2) |
| Example 24 | Li$_4$Ti$_5$O$_{12}$ (1 μm) (8.0 g/m$^2$) (3.23 g/cm$^3$) | Li$_4$Ti$_5$O$_{12}$ (3.40 μm) (3.28 g/cm$^3$) | 0.05 | 6.93 | 2M-LiBF$_4$/EC + PC + GBL(1:1:4) |
| Example 25 | Li$_4$Ti$_5$O$_{12}$ (0.5 μm) (9.1 g/m$^2$) (3.23 g/cm$^3$) | Li$_4$Ti$_5$O$_{12}$ (3.40 μm) (3.28 g/cm$^3$) | 0.06 | 6.95 | 2M-LiBF$_4$/EC + PC + GBL(1:1:4) |
| Example 26 | Li$_4$Ti$_5$O$_{12}$ (0.90 μm) (8.1 g/m$^2$) (3.23 g/cm$^3$) | Li$_4$Ti$_5$O$_{12}$ (2 μm) (3.26 g/cm$^3$) | 0.03 | 6.81 | 2M-LiBF$_4$/EC + PC + GBL(1:1:4) |
| Example 27 | Li$_4$Ti$_5$O$_{12}$ (0.90 μm) (8.1 g/m$^2$) (3.23 g/cm$^3$) | Li$_4$Ti$_5$O$_{12}$ (50 μm) (3.31 g/cm$^3$) | 0.08 | 6.66 | 2M-LiBF$_4$/EC + PC + GBL(1:1:4) |
| Example 28 | Li$_4$Ti$_5$O$_{12}$ (0.90 μm) (8.1 g/m$^2$) (3.23 g/cm$^3$) | Li$_4$Ti$_5$O$_{12}$ (3 μm) (3.26 g/cm$^3$) | 0.03 | 6.81 | |

TABLE 3-continued

| | First negative electrode active material particles (Particle diameter [μm]) (specific surface area [g/m²]) (true density [g/cm³]) | Second negative electrode active material particles (Particle diameter [μm]) (true density [g/cm³]) | Difference in true density ($\rho_2 - \rho_1$) | Peak frequency ratio ($F_1/F_2$) | Nonaqueous electrolyte |
|---|---|---|---|---|---|
| Example 29 | $Li_4Ti_5O_{12}$ (0.90 μm) (8.1 g/m²) (3.23 g/cm³) | $Li_4Ti_5O_{12}$ (40 μm) (3.31 g/cm³) | 0.08 | 6.66 | $2M\text{-}LiBF_4/EC + PC + GBL(1:1:4)$ |
| Example 30 | $Li_4Ti_5O_{12}$ (0.90 μm) (8.1 g/m²) (3.23 g/cm³) | $Li_4Ti_5O_{12}$ (3.93 μm) (5.73 g/cm³) | 2.50 | 6.92 | $2M\text{-}LiBF_4/EC + PC + GBL(1:1:4)$ |

TABLE 4

| | First negative electrode active material particles (Particle diameter [μm]) (specific surface area [g/m²]) (true density [g/cm³]) | Second negative electrode active material particles (Particle diameter [μm]) (true density [g/cm³]) | Difference in true density ($\rho_2 - \rho_1$) | Peak frequency ratio ($F_1/F_2$) | Nonaqueous electrolyte |
|---|---|---|---|---|---|
| Example 31 | $Li_4Ti_5O_{12}$ (0.90 μm) (8.1 g/m²) (3.23 g/cm³) | $Li_4Ti_5O_{12}$ (3.90 μm) (3.25 g/cm³) | 0.02 | 6.94 | $2M\text{-}LiBF_4/EC + PC + GBL(1:1:4)$ |
| Example 32 | $Li_4Ti_5O_{12}$ (0.90 μm) (8.1 g/m²) (3.23 g/cm³) | $Li_4Ti_5O_{12}$ (3.94 μm) (5.23 g/cm³) | 2.00 | 6.96 | $2M\text{-}LiBF_4/EC + PC + GBL(1:1:4)$ |
| Example 33 | $Li_4Ti_5O_{12}$ (0.90 μm) (8.1 g/m²) (3.23 g/cm³) | $Li_4Ti_5O_{12}$ (3.40 μm) (3.28 g/cm³) | 0.05 | 2.00 | $2M\text{-}LiBF_4/EC + PC + GBL(1:1:4)$ |
| Example 34 | $Li_4Ti_5O_{12}$ (0.90 μm) (8.1 g/m²) (3.23 g/cm³) | $Li_4Ti_5O_{12}$ (3.40 μm) (3.28 g/cm³) | 0.05 | 20.00 | $2M\text{-}LiBF_4/EC + PC + GBL(1:1:4)$ |
| Example 35 | $Li_4Ti_5O_{12}$ (0.90 μm) (8.1 g/m²) (3.23 g/cm³) | $Li_4Ti_5O_{12}$ (3.40 μm) (3.28 g/cm³) | 0.05 | 1.31 | $2M\text{-}LiBF_4/EC + PC + GBL(1:1:4)$ |
| Example 36 | $Li_4Ti_5O_{12}$ (0.90 μm) (8.1 g/m²) (3.23 g/cm³) | $Li_4Ti_5O_{12}$ (3.40 μm) (3.28 g/cm³) | 0.05 | 21.87 | $2M\text{-}LiBF_4/EC + PC + GBL(1:1:4)$ |

TABLE 5

| | First negative electrode active material particles (Particle diameter [μm]) (specific surface area [g/m²]) (true density [g/cm³]) | Second negative electrode active material particles (Particle diameter [μm]) (true density [g/cm³]) | Difference in true density ($\rho_2 - \rho_1$) | Peak frequency ratio ($F_1/F_2$) | Nonaqueous electrolyte |
|---|---|---|---|---|---|
| Comparative Example 1 | $Li_4Ti_5O_{12}$ (0.90 μm) (8.1 g/m²) (3.23 g/cm³) | Non | — | — | $2M\text{-}LiBF_4/EC + PC + GBL(1:1:4)$ |
| Comparative Example 2 | $Li_4Ti_5O_{12}$ (0.90 μm) (8.1 g/m²) (3.23 g/cm³) | $Li_4Ti_5O_{12}$ (2.87 μm) (3.19 g/cm³) | −0.04 | 6.45 | $2M\text{-}LiBF_4/EC + PC + GBL(1:1:4)$ |
| Comparative Example 3 | $Li_4Ti_5O_{12}$ (0.90 μm) (8.1 g/m²) (3.23 g/cm³) | $Li_4Ti_5O_{12}$ (22.12 μm) (5.87 g/cm³) | 2.64 | 6.38 | $2M\text{-}LiBF_4/EC + PC + GBL(1:1:4)$ |
| Comparative Example 4 | $Li_4Ti_5O_{12}$ (0.90 μm) (8.1 g/m²) (3.23 g/cm³) | $Li_4Ti_5O_{12}$ (1.51 μm) (3.22 g/cm³) | −0.01 | 6.66 | $2M\text{-}LiBF_4/EC + PC + GBL(1:1:4)$ |
| Comparative Example 5 | $Li_4Ti_5O_{12}$ (0.90 μm) (8.1 g/m²) (3.23 g/cm³) | $Li_4Ti_5O_{12}$ (55.34 μm) (3.43 g/cm³) | 0.20 | 6.38 | $2M\text{-}LiBF_4/EC + PC + GBL(1:1:4)$ |
| Comparative Example 6 | $Li_4Ti_5O_{12}$ (0.90 μm) (8.1 g/m²) (3.23 g/cm³) | Non | — | — | $1.2M\text{-}LiPF_6/EC + MEC(1:2)$ |

Example 37

Manufacture of Positive Electrode $LiMn_2O_4$ particles with an average particle diameter of 0.90 μm and a true density $\rho_1$ of 5.26 g/cm³ were prepared as the first positive electrode active material particles. $LiMn_2O_4$ particles with an average particle diameter of 3.48 μm and a true density $\rho_2$ of 5.56 g/cm³ were also prepared as the second positive electrode active material particles. A graphite powder as a conductive agent in a proportion of 8% by weight relative to the total weight of the positive electrode and PVdF as a binder in a proportion of 5% by weight relative to the total weight of the positive electrode were blended to the electrode active material comprising 82 parts by weight of the first positive electrode active material particles and 5 parts by weight of the second positive electrode active material particles. A slurry was prepared by dispersing these materials in N-methyl pyrrolidone (NMP). The slurry obtained was applied on an aluminum foil with a thickness of 15 μm and an average crystal grain size of 4 μm, followed by drying and pressing to manufacture a positive electrode with an electrode density of 3.3 g/cm³.

A nonaqueous electrolyte battery was manufactured by the same method as described in Example 1, except that the positive electrode obtained above was used.

Examples 38 to 42

The battery was manufactured by the same method as in Example 37, except that the construction of the positive electrode or nonaqueous electrolyte was changed as shown in Table 6.

Comparative Example 7

The battery was manufactured by the same method as in Example 37, except that the construction of the positive electrode was changed as shown in Table 6, and the negative electrode in Comparative Example 1 was used.

TABLE 6

| | First positive electrode active material particles (Particle diameter [μm]) (specific surface area [g/m$^2$]) (true density [g/cm$^3$]) | Second positive electrode active material particles (Particle diameter [μm]) (true density [g/cm$^3$]) | Difference in true density ($\rho_2 - \rho_1$) | Peak frequency ratio ($F_1/F_2$) | Nonaqueous electrolyte |
|---|---|---|---|---|---|
| Example 37 | LiMn$_2$O$_4$ (0.90 μm) (4.3 g/m$^2$) (5.26 g/cm$^3$) | LiMn$_2$O$_4$ (3.48 μm) (5.56 g/cm$^3$) | 0.30 | 5.83 | 2M-LiBF4/EC + PC + GBL(1:1:4) |
| Example 38 | LiMn$_2$O$_4$ (1 μm) (4.2 g/m$^2$) (5.31 g/cm$^3$) | LiMn$_2$O$_4$ (3.48 μm) (5.56 g/cm$^3$) | 0.25 | 4.32 | 2M-LiBF$_4$/EC + PC + GBL(1:1:4) |
| Example 39 | LiMn$_2$O$_4$ (0.90 μm) (4.3 g/m$^2$) (5.26 g/cm$^3$) | LiMn$_2$O$_4$ (2 μm) (5.67 g/cm$^3$) | 0.39 | 6.13 | 2M-LiBF$_4$/EC + PC + GBL(1:1:4) |
| Example 40 | LiMn$_2$O$_4$ (0.90 μm) (4.3 g/m$^2$) (5.26 g/cm$^3$) | LiMn$_2$O$_4$ (50 μm) (5.54 g/cm$^3$) | 0.28 | 6.08 | 2M-LiBF$_4$/EC + PC + GBL(1:1:4) |
| Example 41 | LiMn$_2$O$_4$ (0.90 μm) (4.3 g/m$^2$) (5.26 g/cm$^3$) | LiMn$_2$O$_4$ (3.28 μm) (5.27 g/cm$^3$) | 0.01 | 5.77 | 2M-LiBF$_4$/EC + PC + GBL(1:1:4) |
| Example 42 | LiMn$_2$O$_4$ (0.90 μm) (4.3 g/m$^2$) (5.26 g/cm$^3$) | LiMn$_2$O$_4$ (4.26 μm) (7.76 g/cm$^3$) | 2.5 | 5.71 | 2M-LiBF$_4$/EC + PC + GBL(1:1:4) |
| Comparative Example 7 | LiMn$_2$O$_4$ (0.90 μm) (4.3 g/m$^2$) (5.26 g/cm$^3$) | Non | — | — | 2M-LiBF$_4$/EC + PC + GBL(1:1:4) |

The batteries manufactured in the examples and comparative examples were subjected to a cycle test in which a charging until a battery voltage of 2.7 V at a charge rate of 1 C at 45° C. and a discharging until a battery voltage of 1.5 V at a discharge rate of 1 C are performed repeatedly. The number of cycles when the battery capacity reached 80% of the first cycle discharge capacity after repeating the cycle test is shown in Tables 7 and 8 below.

TABLE 7

| | Cycle life |
|---|---|
| Example 1 | 1539 |
| Example 2 | 1474 |
| Example 3 | 1331 |
| Example 4 | 1258 |
| Example 5 | 1093 |
| Example 6 | 1312 |
| Example 7 | 1038 |
| Example 8 | 1174 |
| Example 9 | 1193 |
| Example 10 | 1460 |
| Example 11 | 1472 |
| Example 12 | 1298 |
| Example 13 | 1338 |
| Example 14 | 1348 |
| Example 15 | 1299 |
| Example 16 | 1378 |
| Example 17 | 1383 |
| Example 18 | 1405 |
| Example 19 | 1343 |
| Example 20 | 1356 |
| Example 21 | 1364 |
| Example 22 | 1415 |
| Example 23 | 1041 |
| Example 24 | 1496 |
| Example 25 | 1075 |
| Example 26 | 1316 |
| Example 27 | 1265 |
| Example 28 | 1520 |
| Example 29 | 1343 |
| Example 30 | 1018 |
| Example 31 | 1316 |
| Example 32 | 1487 |
| Example 33 | 1267 |
| Example 34 | 1282 |
| Example 35 | 1192 |
| Example 36 | 1188 |
| Comparative Example 1 | 1007 |
| Comparative Example 2 | 973 |
| Comparative Example 3 | 981 |
| Comparative Example 4 | 1006 |
| Comparative Example 5 | 993 |
| Comparative Example 6 | 993 |

TABLE 8

| | Cycle life |
|---|---|
| Example 37 | 1034 |
| Example 38 | 1023 |
| Example 39 | 1015 |
| Example 40 | 958 |
| Example 41 | 965 |
| Example 42 | 962 |
| Comparative Example 7 | 863 |

Table 7 shows that the batteries in Examples 1 to 36 are superior to the batteries in Comparative Examples 1 to 6 with respect to the cycle performance. This shows that the cycle performance was improved by using the first active material particles with an average particle diameter of 1 μm or less and a lithium diffusion coefficient of $1 \times 10^{-9}$ cm$^2$/sec or less at 20° C. and the second active material particles with an average particle diameter of 2 to 50 μm, and by increasing the true density of the second active material particles by 0.01 to 2.5 g/cm$^3$ compared to the true density of the first active material particles.

Comparisons among Examples 1 and 16 to 22 show that the cycle performance in Example 1 using Li$_{4+x}$Ti$_5$O$_{12}$ ($0 \leqq x \leqq 3$) for both the first and second active materials is superior to the cycle performance in Examples 16 to 22 in which the second active material is MnO$_2$, FeS, FeS$_2$, CuO, Cu$_4$O(PO$_4$)$_2$, MoO$_3$ or TiO$_2$. This shows that using Li$_{4+x}$Ti$_5$O$_{12}$ ($0 \leqq x \leqq 3$)

for both the first and second active materials is effective for improving the cycle performance.

Comparisons among Examples 1, 9 to 12 and 33 to 36 show that the cycle performance in Examples 1, 9 to 12, 33 and 34, in which the frequency ratio ($F_1/F_2$) of the first and second peaks in the particle diameter distribution measured by the laser diffraction is 2 to 20, is superior to the cycle performance in Examples 35 and 36 in which the frequency ratio ($F_1/F_2$) is less than 2 or exceeds 20. The cycle performance in Examples 1, 10 and 11 in which the frequency ratio ($F_1/F_2$) is 5 to 15 is particularly excellent. Accordingly, the frequency ratio ($F_1/F_2$) is desirably in the range of 2 to 20, more preferably 5 to 15, for improving the cycle performance.

The cycle performance in Example 1 in which a nonaqueous electrolyte containing EC, PC and GBL is superior to the cycle performance in Example 23 in which EC and MEC are used, and it was shown that using the three components of EC, PC and GBL permits excellent cycle performance to be readily obtained. As shown in Comparative Examples 1 and 6, the effect for improving the cycle performance by using the three components of EC, PC and GBL is not sufficiently exhibited when only the particles of the first negative electrode active material are used as the negative electrode active material, and the effect for improving the cycle performance is evidently manifested when the particles of the first and second active materials are used together.

Comparison among Examples 8 and 30 to 32 show that the cycle performance in Examples 31 and 32 in which the true density difference is 0.02 to 2 g/cm³ is superior to the cycle performance in Examples 8 and 30 in which the true density difference exceeds 2 g/cm³.

Comparison among Examples 13, 15 and 26 to 29 show that the cycle performance in Examples 28 and 29 in which the average particle diameter of the second active material particles is 3 to 40 µm is superior to the cycle performance in Examples 13, 15, 26 and 27 in which the average particle diameter is out of this range.

The results in Table 8 show that cycle performance is also improved by using the first and second active materials for the positive electrode.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery comprising:
a positive electrode;
a negative electrode comprising a current collector made of aluminum or an aluminum alloy and an active material layer laminated on the current collector, the active material layer containing
first active material particles that have an average particle diameter of 1 µm or less and are represented by $Li_{4+x}Ti_5O_{12}$ ($0 \leq x \leq 3$) and
second active material particles represented by $Li_{4+x}Ti_5O_{12}$ ($0 \leq x \leq 3$), $MnO_2$, FeS, $FeS_2$, CuO, $Cu_4O(PO_4)_2$, $MoO_3$ or $TiO_2$ and having an average particle diameter of 2 to 50 µm, and a true density of the second active material particles being larger by 0.01 to 2.5 g/cm³ than a true density of the first active material particles; and
a nonaqueous electrolyte.

2. The nonaqueous electrolyte battery according to claim 1, wherein a particle diameter distribution measured by a laser diffraction for a mixture containing the first active material particles and the second active material particles has a first peak at a smaller particle diameter and a second peak at a larger particle diameter.

3. A battery pack comprising a nonaqueous electrolyte battery comprising a positive electrode, a negative electrode and a nonaqueous electrolyte,
wherein the negative electrode comprises a current collector made of aluminum or an aluminum alloy and an active material layer laminated on the current collector, the active material layer containing
first active material particles that have an average particle diameter of 1 µm or less and are represented by $Li_{4+x}Ti_5O_{12}$ ($0 \leq x \leq 3$) and
second active material particles represented by $Li_{4+x}Ti_5O_{12}$ ($0 \leq x \leq 3$), $MnO_2$, FeS, $FeS_2$, CuO, $Cu_4O(PO_4)_2$, $MoO_3$ or $TiO_2$ and having an average particle diameter of 2 to 50 µm, and a true density of the second active material particles is larger by 0.01 to 2.5 g/cm³ than a true density of the first active material particles.

4. A rechargeable vacuum cleaner comprising the battery pack according to claim 3.

5. The battery pack according to claim 3, wherein a particle diameter distribution measured by a laser diffraction for a mixture containing the first active material particles and the second active material particles has a first peak at a smaller particle diameter and a second peak at a larger particle diameter.

* * * * *